United States Patent
Peleg et al.

(10) Patent No.: US 7,587,433 B2
(45) Date of Patent: Sep. 8, 2009

(54) METHOD AND SYSTEM FOR IN-PLACE UPDATING CONTENT STORED IN A STORAGE DEVICE

(75) Inventors: Sharon Peleg, Ramat Hasharon (IL); Evyatar Meller, Petach-Tikva (IL)

(73) Assignee: Red Bend Ltd., Hos Hasharon (IL)

(*) Notice: Subject to any disclaimer, the term of this patent is extended or adjusted under 35 U.S.C. 154(b) by 67 days.

(21) Appl. No.: 11/141,208

(22) Filed: Jun. 1, 2005

(65) Prior Publication Data

US 2006/0004756 A1 Jan. 5, 2006

Related U.S. Application Data

(60) Provisional application No. 60/575,425, filed on Jun. 1, 2004.

(51) Int. Cl.
  G06F 17/30 (2006.01)
  G06F 7/00 (2006.01)
(52) U.S. Cl. ............... 707/203; 707/204; 707/202; 707/10; 717/170
(58) Field of Classification Search .......... 707/8, 707/202, 203, 204, 205; 717/169, 171, 172, 717/170; 709/212, 220, 250
See application file for complete search history.

(56) References Cited

U.S. PATENT DOCUMENTS

| | | | |
|---|---|---|---|
| 5,043,871 A * | 8/1991 | Nishigaki et al. ........... 707/202 |
| 5,634,052 A * | 5/1997 | Morris ........................ 707/1 |
| 6,018,747 A | 1/2000 | Burns et al. |
| 6,141,683 A * | 10/2000 | Kraml et al. ................ 709/220 |
| 6,438,749 B1 | 8/2002 | Chamberlain |
| 6,546,552 B1 * | 4/2003 | Peleg ......................... 717/170 |
| 6,832,373 B2 | 12/2004 | O'Neill |
| 6,996,817 B2 * | 2/2006 | Birum et al. ................ 717/170 |
| 2002/0010910 A1 | 1/2002 | Crudele et al. |
| 2005/0085222 A1 * | 4/2005 | Przybilski et al. ........... 455/418 |
| 2005/0132179 A1 * | 6/2005 | Glaum et al. ................. 713/1 |

FOREIGN PATENT DOCUMENTS

| | | |
|---|---|---|
| EP | 1 318 452 A1 | 6/2003 |
| WO | WO 2004/114130 A2 | 12/2004 |
| WO | WO 2005/003963 A2 | 1/2005 |

* cited by examiner

*Primary Examiner*—Pierre M Vital
*Assistant Examiner*—Loan T Nguyen
(74) *Attorney, Agent, or Firm*—The Law Office of Michael E. Kondoudis

(57) ABSTRACT

Method and system for updating a stored version of content stored in a storage device using an update package. The update package that includes update commands is adapted for updating an original version of content to an updated version. The updating is carried out in accordance with an update sequence. The method includes determining direction of the updating. If the direction is indicative of forward then the method forward-updates the stored version to the updated version in accordance with the update sequence. If the direction is indicative of roll-back, the method generates a roll-back update sequence opposite to the update sequence and rolls-back the stored version to the original version in accordance with the roll-back update sequence.

11 Claims, 13 Drawing Sheets

US 7,587,433 B2

METHOD AND SYSTEM FOR IN-PLACE UPDATING CONTENT STORED IN A STORAGE DEVICE

FIELD OF THE INVENTION

This invention relates to updating a stored version of content stored in a storage device using an update package. More specifically, this invention relates to in-place updating.

BACKGROUND OF THE INVENTION

Sometimes it is required to update content stored in a storage device. For example, if the content is a software (such as an executable file), it is sometimes required to upgrade the software. However, it should be noted that sometimes other types of content also require updates, such as text or data stored in a database, etc. Hereinafter the term "old version" or "original version" refers to content before update, the term "new version" or "updated version" refers to the content after it was updated. An "update package", sometimes referred to also as a "difference", a "difference result" or a "delta", includes data provided as input for an update process, wherein the update process updates the old version to the new version in accordance with the update package.

There are several ways known in the art for generating update packages and using them for updating versions. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry, the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses a system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

U.S. Pat. No. 6,832,373 ("System and method for updating and distributing information", published 2004) discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and may be performed more quickly than through the use of technologies existing when U.S. Pat. No. 6,832,373 was filed.

It is known to those versed in the art that content can be stored in a storage device, such as disk or memory, while some storage devices are organized in blocks. Blocks being part of the original version are referred to as "old blocks" or "original blocks", while blocks being part of an updated version are referred to as "new blocks" or "updated blocks". In addition, when updating an original version forming an updated version thereby, the updated version can sometimes use content previously stored in blocks of the original version. That is, the content of updated blocks is sometimes similar to content of original blocks.

Furthermore, available storage devices can have a limited space. Thus, while updating versions in a storage device, it is sometimes preferred to store the new version in place of the old version, saving space thereby. Such an update process, where the new version occupies at least some of the space previously occupied by the old version, is referred to, in the art as "in-place update" or "updating in-place".

It should be noted that an update process can process the blocks of the old version in an order which does not necessarily correspond to the sequential order of the blocks within the file. The order, in accordance with which blocks of the old version are updated, is referred to as an "update sequence" or "update order".

One of the outcomes of in-place updating is that, once storage blocks have been updated, the content of at least some of them being part of the original version (i.e., at least part of the original content), is potentially lost. Therefore, once the process of updating has started and after some original blocks are modified to hold updated content (the updated content being part of the updated version), the storage device can store content which is partly original and partly updated version.

In addition, it is known in the art that the old content is sometimes required for the update process, such as in a delta update method. Therefore, if the update process is interrupted through the course of its running, before the creation of the new version is completed and when the stored content (or stored version) is partly old version and partly new version, the in-place update process cannot be repeated from start anymore.

In light of the above, it is realized that in-place updating can be sensitive to interruptions. When the process of in-place updating tries to resume from the point where it was interrupted (the resume location), it requires information that allows calculation of the location of interruption. After locating the location of interruption, the update process may also need to restore other information, which was available to the interrupted process at the time of interruption.

Currently in the art, a record referred to hereinafter as "state record" is commonly used for storing results of calculations calculated before the interruption. The results, together with the identification of the current updated block form a "state" of the in-place update process. For example, if the update package is compressed and it is being decompressed on-the-fly during the update process for reading just the necessary parts for updating each old block, and were the amount of data decompressed from the update package, depends on old contents of updated blocks, then this amount cannot be re-computed again once blocks were actually updated.

As mentioned already above, the process cannot restart from its beginning. Therefore, it might be that some of the data in the state record cannot be re-computed even if the last updated record is known—it needs to be restored by other means. The common practice in the prior art is to maintain a state-record as mentioned above in a storage device accessible to the update process, and to update it periodically during the update process, to reflect its progress, an operation referred to hereinafter as "state recording". Using state recording enables the resumption of an in-place update process by re-constructing the state of the process as it was at the last successful update operation, and to continue the process towards its completion.

In some cases, the information stored during state recording cannot be part of the contents being updated and must be separated to another area of storage. State recording takes time since it involves read & write operations from and to the storage device. In some case, where the read & write operations of the storage device are allowed only for whole blocks, the time required for the whole process is doubled—for each updated block there is another block to update—the one holding the state's recording.

It is also known to those versed in the art that, in order to properly resume an interrupted in-place update process, there may also be the need to handle a corrupted block which was the result of an interrupted storage write operation. It could be impossible to restore the information in that block, as the block's old content was modified and there may be no way to restore its old content just by examining the file's other blocks. This problem is resolved by the prior art by using a backup buffer where any block's new content is being stored there first and then copying its content to its target block to be updated (hereinafter referred as "update-first") or alternatively, the old block is copied to a backup buffer and afterwards the new content is generated and stored in its target block (hereinafter referred as "backup-first"). This method is also known in the art as "2-phase commit" scheme.

Updating software of embedded devices such as mobile telephones is an example for an in-place update procedure. It is realized that storage of mobile telephones can be limited. For example, a mobile telephone can have enough storage to hold only one version of its software (also called firmware). Maintaining state-recording inside blocks of the firmware itself is clearly not practical, since it would interfere heavily with the process of creating the software and therefore it must be stored in a separate area of storage. Updating mobile phone's firmware is a relatively slow process due to the speed of the storage devices used (Flash memory). During the update process the phone is inoperable, creating the need to minimize the time it takes.

There is a need in the art for faster and reliable updating procedures, allowing shorter interruptions in embedded devices operation during software update.

There is a need in the art to provide for a new method and system for updating versions of content stored in a storage device.

SUMMARY OF THE INVENTION

It is therefore an object of the invention to provide a new method and system for updating versions of content stored in a storage device.

By one embodiment, the invention provides a method for updating a stored version of content stored in a storage device using an update package, wherein the update package is adapted for updating an original version of content to an updated version, wherein the update package includes update commands and wherein the updating is carried out in accordance with an update sequence, the method comprising: determining direction of the updating including: if the direction is indicative of forward then forward-updating the stored version to the updated version in accordance with the update sequence; and if the direction is indicative of rollback generating a roll-back update sequence opposite to the update sequence and rolling-back the stored version to the original version in accordance with the roll-back update sequence.

By a further embodiment, the invention provides a method for reversing an update process, the update process is adapted for updating a stored version of content stored in a storage device to one of a group including an updated version and an original version using an update package, the method comprising: reversing update commands in the update package that were previously performed during updating.

By a still further embodiment, the invention provides a method for in-place updating a stored version of content stored in a storage device using an update package, wherein the update package is adapted for updating an original version of content to an updated version, the method comprising: determining direction of the updating; and if the direction is indicative of forward then forward-updating the stored version to the updated version; otherwise rolling-back the stored version to the original version.

By another embodiment, the invention provides a method for providing an update process of a stored version, comprising: providing a forward update for updating the stored version to a first version; providing a roll-back update for updating the stored version to a second version; applying a first update operation being either of said forward update and said roll-back update; and applying a second update operation being either of said forward update and said roll-back update and being other than said first update operations.

By yet another embodiment, the invention provides a method for providing an update process of a stored version, comprising: applying a roll-back update for updating the stored version to an original version.

By yet another embodiment, the invention provides a system for updating a stored version of content stored in a storage device using an update package, wherein the update package is adapted for updating an original version of content to an updated version, wherein the update package includes update commands and wherein the updating is carried out in accordance with an update sequence, the system comprising: a direction determination unit adapted for determining direction of the updating a forward updating processor coupled to the direction determination unit for forward-updating the stored version to the updated version in accordance with the update sequence when the direction of the updating is indicative of forward; a roll-back sequence generator coupled to the direction determination unit for generating a roll-back update sequence opposite to the update sequence when the direction of the updating is indicative of roll-back; and a roll-back updating processor coupled to the roll-back sequence generator for rolling back the stored version to the original version in accordance with the roll-back update.

By yet another embodiment, the invention provides a system for reversing an update process, the update process is adapted for updating a stored version of content stored in a storage device to one of a group including an updated version and an original version using an update package, the system comprising: an update commands reversal unit for reversing update commands in the update package that were previously performed during updating.

By yet another embodiment, the invention provides a system for in-place updating a stored version of content stored in a storage device using an update package, wherein the update package is adapted for updating an original version of content to an updated version, the system comprising: a direction determination unit adapted for determining direction of the updating; a forward updating processor coupled to the direction determination unit for forward-updating the stored version to the updated version when the direction is indicative of forward; and a roll-back updating processor coupled to the direction determination unit for rolling-back the stored version to the original version when the direction is indicative of roll-back.

Still by a further embodiment, the invention provides a program storage device readable by machine, tangibly embodying a program of instructions executable by the machine to perform a method for updating a stored version of content stored in a storage device using an update package, wherein the update package is adapted for updating an original version of content to an updated version, wherein the update package includes update commands and wherein the updating is carried out in accordance with an update sequence, the method comprising: determining direction of the updating including: if the direction is indicative of forward then forward-updating the stored version to the updated version in accordance with the update sequence; and if the direction is indicative of roll-back generating a roll-back update sequence opposite to the update sequence and rolling-back the stored version to the original version in accordance with the roll-back update sequence.

Still by a further embodiment, the invention provides a computer program product comprising a computer useable medium having computer readable program code embodied therein for updating a stored version of content stored in a storage device using an update package, wherein the update package is adapted for updating an original version of content to an updated version, wherein the update package includes update commands and wherein the updating is carried out in accordance with an update sequence, the computer program product comprising: computer readable program code for causing the computer to determine direction of the updating including: computer readable program code for causing the computer to forward-update the stored version to the updated version in accordance with the update sequence if the direction is indicative of forward; and computer readable program code for causing the computer to generate a roll-back update sequence opposite to the update sequence and rolling-back the stored version to the original version in accordance with the roll-back update sequence if the direction is indicative of roll-back.

Still by a further embodiment, the invention provides a program storage device readable by machine, tangibly embodying a program of instructions executable by the machine to perform a method for reversing an update process, the update process is adapted for updating a stored version of content stored in a storage device to one of a group including an updated version and an original version using an update package, the method comprising: reversing update commands in the update package that were previously performed during updating.

Still by a further embodiment, the invention provides a computer program product comprising a computer useable medium having computer readable program code embodied therein for reversing an update process, the update process is adapted for updating a stored version of content stored in a storage device to one of a group including an updated version and an original version using an update package, the computer program product comprising: computer readable program code for causing the computer to reverse update commands in the update package that were previously performed during updating.

Still by a further embodiment, the invention provides a program storage device readable by machine, tangibly embodying a program of instructions executable by the machine to perform a method for in-place updating a stored version of content stored in a storage device using an update package, wherein the update package is adapted for updating an original version of content to an updated version, the method comprising: determining direction of the updating; and if the direction is indicative of forward then forward-updating the stored version to the updated version; otherwise rolling-back the stored version to the original version.

Still by a further embodiment, the invention provides a computer program product comprising a computer useable medium having computer readable program code embodied therein for in-place updating a stored version of content stored in a storage device using an update package, wherein the update package is adapted for updating an original version of content to an updated version, the computer program product comprising: computer readable program code for causing the computer to determine direction of the updating; computer readable program code for causing the computer to forward-update the stored version to the updated version if the direction is indicative of forward; and computer readable program code for causing the computer to roll-back the stored version to the original version otherwise.

Still by a further embodiment, the invention provides a program storage device readable by machine, tangibly embodying a program of instructions executable by the machine to perform a method for providing an update process of a stored version, comprising: providing a forward update for updating the stored version to a first version; providing a roll-back update for updating the stored version to a second version; applying a first update operation being either of said forward update and said roll-back update; and applying a second update operation being either of said forward update and said roll-back update and being other than said first update operations.

Still by a further embodiment, the invention provides a computer program product comprising a computer useable medium having computer readable program code embodied therein for providing an update process of a stored version, the computer program product comprising: computer readable program code for causing the computer to provide a forward update for updating the stored version to a first version; computer readable program code for causing the computer to provide a roll-back update for updating the stored version to a second version; computer readable program code for causing the computer to apply a first update operation being either of said forward update and said roll-back update; and computer readable program code for causing the computer to apply a second update operation being either of said forward update and said roll-back update and being other than said first update operations.

Still by a further embodiment, the invention provides a program storage device readable by machine, tangibly embodying a program of instructions executable by the machine to perform a method for providing an update process of a stored version, comprising: applying a roll-back update for updating the stored version to an original version.

By yet another embodiment, the invention provides a computer program product comprising a computer useable medium having computer readable program code embodied therein for providing an update process of a stored version, the computer program product comprising:

computer readable program code for causing the computer to apply a roll-back update for updating the stored version to an original version.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
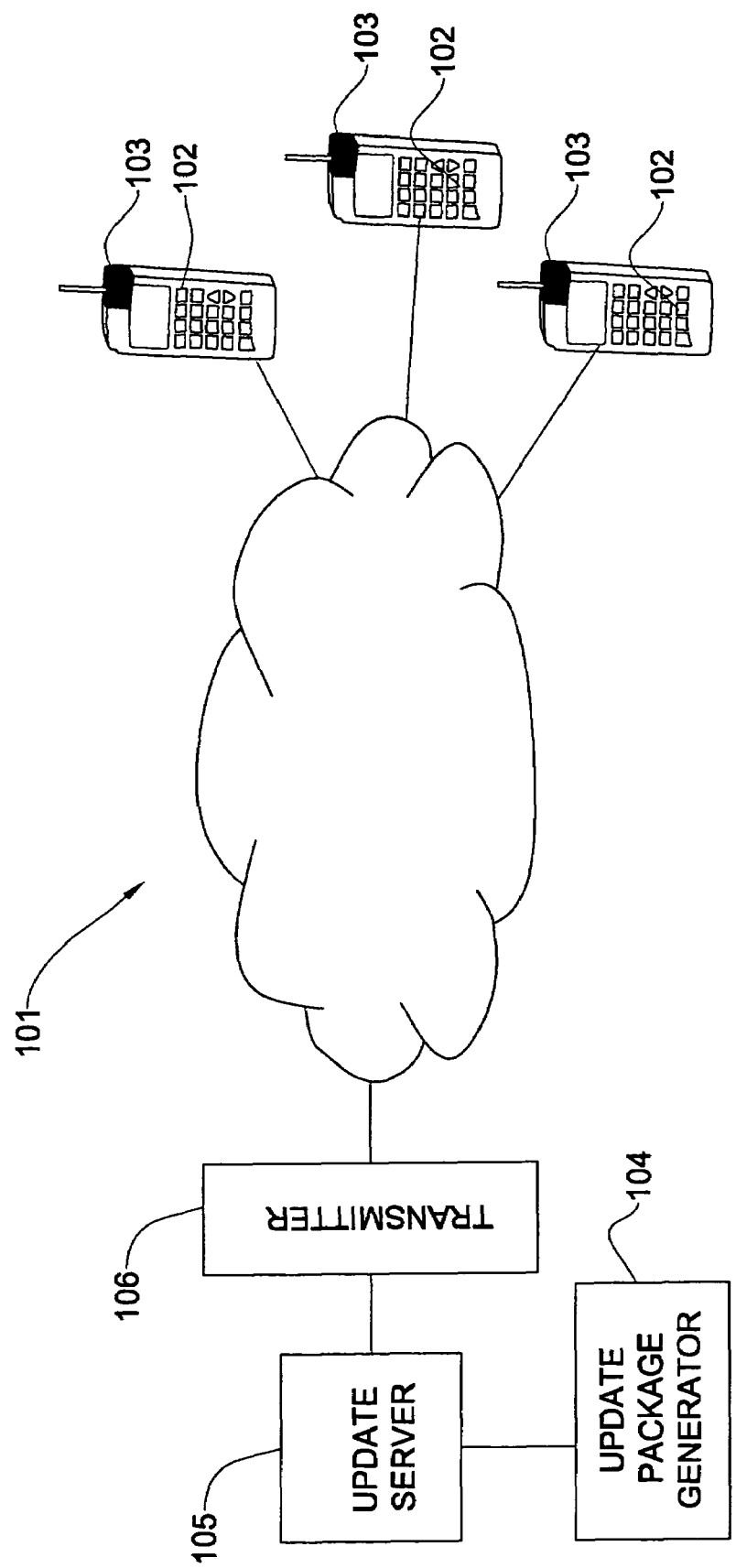
FIG. 1 is a schematic illustration of a system for updating versions in a cellular network, in accordance with one embodiment of the invention.

In the following description components that are common to more than one figure will be referenced by the same reference numerals.

Furthermore, unless specifically noted, the term "update" is used hereinafter to refer to in-place update.

FIG. 1 is a schematic illustration of a system 101 for updating versions in a cellular network, in accordance with one embodiment of the invention. Cellular telephones 102 that are coupled to or include storage devices 103, execute programs that enable their operation. Programs are normally stored in files. The version of the program currently executing in the cellular telephones is referred to, hereinafter, as an "old version" or as an "original version".

It is noted that storage devices, such as the storage devices 103, are sometimes referred to also as "storage devices" or "memory units".

Sometimes there is a need to update the programs in order for the telephones 102 to execute a newer version thereof. Such an updated version is generated by an update process operating in the telephone. The update process operates in accordance with an update package (constituting a "delta file") that the cellular telephone receives.

According to the invention, an update package is generated in an update package generator 104, operating, for example, in a personal computer (PC) or in any other type of computer. The update package is stored in an update server 105 and transmitted, via a transmitter 106 to the cellular telephones 102.

It should be noted that the system 101 illustrated in FIG. 1 is a non-binding example and the invention is not limited to updating programs. Many other types of content stored in storage devices require update, such as data stored in databases, files stored in the storage device etc. Therefore, hereinafter the term "content" will be used instead of "program".

In the same way, the invention is not limited to cellular networks and/or to cellular telephones 102. It should be appreciated that cellular telephones belong to a group referred to as embedded devices. There are other embedded devices, such as Personal Digital Assistants (PDAs), set-top boxes and other consumer electronic devices that are coupled to storage devices for storing content, and sometimes it is required to update the content stored therein. Yet, it is possible to update also content stored in storage devices coupled to non-embedded devices, such as PCs or other computers. Therefore, the storage devices 103 can be, for example, harddisk drives, Flash-memory devices or any other storage device.

For example, a PC, or any other computer, can store files that include data required for its operation or for operation of programs executing therein (such as "info files" or "dot files" known for those versed in the art). Sometimes it is required to update this data, for example, via communications lines, e.g., via the internet or via any other communication means.

Understanding this, instead of using terms such as "telephones", "PDAs" "consumer electronic devices", "computer", "PC", etc., the term "updated devices" will be used hereinafter, and it should be noted that the term an "update device" can refer to any device that is coupled to a storage device and allows updating content stored therein.

It was previously explained that in order to update content stored in the storage devices, update packages are generated, stored in the update server 105 and conveyed to the storage devices or to other devices coupled therewith (such as the cellular telephones 102). Alternatively, it is possible to convey an update package without storing it first in an update server 105. For example, it is possible to convey the update package directly from the update package generator where it is generated. In such a case the machine where the update generator operates or the update generator itself is considered as the update server 105.

Furthermore, in the example illustrated in FIG. 1, the update package is conveyed via the transmitter 106. This is also non-binding and any other way applicable for conveying the update package can be used. For example, it is possible to store the update package on a portable storage device such as a floppy disk or disk on key thus allowing an updated device (such as the telephones 102) to access the update package by reading it there from.

When a cellular telephone 102 receives an update package, it can operate an update process in accordance with the update package, wherein the update process updates the original version for generating another version referred to as an "updated version" or as a "new version". It should be noted that the cellular telephone 102 can operate the update process immediately after receiving the update package. Alternatively, it can store the update package in a non-volatile memory, such as in the storage device 103, and operate the update process in some later time (such as on the next time the telephone reboots).

It is noted that a storage device can store content of original and/or updated versions. Those versed in the art would appreciate that content is normally stored in files, while a file, or the content stored therein is subject to updates by an update process.

In many times a file is constituted of logically sequential content. For example, in a file that includes text, wherein the text is "123456789", the character '2' is logically consecutive to the character '1', the character '3' is logically consecutive to the character '2' etc. However, those versed in the art would appreciate that, when storing this file in a storage device, it can become fragmented, i.e., different portions of the file can be stored in different areas of the storage device. In other words, a logically sequential content is not necessarily stored in a physically sequential manner in the storage device.

Furthermore, those versed in the art will appreciate that many storage devices include discrete areas in them. For example, hard drives include sectors and so do flash memory modules. A discrete area in a storage device is referred to as a "storage block", or shortly as "block". It is noted though that hard drives and flash memory modules are only two examples of a storage device. There are other known per se storage devices such as Random Access Memory (RAM) etc.

Bearing in mind that a logically sequential content is not necessarily stored in a physically sequential manner in the storage device, it should be appreciated that sequential content can be spread over several storage blocks. Furthermore, one storage block can include content belonging to several logically sequential contents (such as several files). Returning now to the previous example, where the text "123456789" constitutes logically sequential content, it should be appreciated that the content "1234" can be stored in one physical block, while the content "56789" in this example can be stored in a different physical block that physically precedes the block where "1234" is stored (yet it is clear that logically the content "1234" precedes the content "56789").

The Logically sequential text "123456789" will be further considered as an original version. According to the example, it is possible to update this file to include an updated version, wherein the text stored in the updated version is "123756489". In this updated version the characters '4' and '7' were switched, compared to their position in the original version or in different words, in the updated version the character '7' replaces the character '4' that appears in the original version, while the character '4' replaces the character '7'. It should thus be appreciated that, in order to generate this updated version, it is possible to divide the original version into several segments (each segments constitutes a "logical block"). For example, the first segment includes the content "123", the second segment's content is "4", the third segment includes "56", the fourth includes "7" and the fifth includes "89". When generating the updated version, the first, third and fifth segments are left intact, while the second and fourth segments are switched. Thus, a segment includes logically sequential content.

It is possible to further define that segments are logically sequential segments of content that perform uniform behavior during update. In the example, the segment "123" is logically sequential and it informally stays unmodified in the updated version. Similarly, the segment "7" is also logically sequential (a sequence of 1 character is a valid sequence), and it is uniformly moved to occupy the position formerly occupied by "4", etc.

The previous example of the "123456789" text and the update thereof to the updated version "123756489", wherein each segment includes logically sequential content and performs uniform behavior during update, is a simplified example. In other examples it is possible to divide the content into segments that are logically sequential, perform uniform behavior during update and occupy physically sequential area in one or more physical block. Thus, if "123" is fragmented in a way where "12" is stored in a first block, while "3" is stored in a second block, wherein "12" does not sequentially precede "3", then according to this example "123", although logically sequential, should be divided into two segments (specifically there are "12" and "3").

In this latter example the segment "12" can yet reside on two different blocks, as long as the blocks are sequential (a first block sequentially precedes a second block) and as long as the character '1' is stored in an area ending the first block while the character '2' is stored in the area opening the second block.

This latter example is non-binding. For example, an alternative embodiment can limit a segment to occupy physically sequential area in one physical block (unlike "one or more" in the previous example). Thus, if "12" is sequentially stored in two sequential blocks it must be further divided into two segments (one is "1" and the second is "2").

When content of a segment in the updated version (an "updated segment") corresponds to content of a segment in the original version (an "original segment"), these segments are considered as "corresponding segments" or "matched segments". Correspondence refers to any logical connection between the segments, wherein the updated segment can be a copy of the original segment, it can be a modified copy of the original segment (e.g., in large segments it is sometimes preferred to copy a whole segment and then modify part of the copied content), or it can include content received by performing a calculation using content stored in the original segment etc.

It is noted that sometimes there may be more than one updated segment corresponding to a certain original segment (e.g., the content of the original segment is copied twice, thus generating two updated segments corresponding thereto). The opposite is also true: Sometimes there may be more than one original segment corresponding to a single updated segment (e.g., in order to calculate the content of a single updated segment, it is possible to use content stored in two distinct original segments).

It was previously mentioned that in order to update an original version to an updated version, an update process operate in accordance with an update package. According to one embodiment, the update package includes update commands (shortly "commands"), wherein each command corresponds to one segment in the original and/or updated versions. An update command can include a code indicative of an update operation and it is appreciated that the codes can be, e.g., a numerical code, bit-mask, a string code or any other code applicable to the case.

There are different update operations and hence update commands that are allowed for updating an original version to an updated version. For example:

A "delete" command corresponds to one segment in the original version, whose content is deleted when generating the updated version (hence this command does not correspond to any segment in the updated version). A deleted segment in the original version has no corresponding segment in the updated version. The delete command frees the segment in the storage device thus allowing writing other content into the segment. That is, the update process does not need to physically delete the content. It can only mark this area as free.

An "insert" command corresponds to one segment in the update version, wherein new content is added into this segment. An inserted segment in the updated version has no corresponding segment in the original version. It is noted that in some embodiments, when inserted content is written in a non-free area (i.e., physical area that includes content that was not freed before, for example, by a delete command), the original content is overridden by the inserted content and therefore considered as deleted. In these embodiments such an insert command is considered as equivalent to a delete command followed by an insert command.

A "copy" command corresponds to one segment in the original version (an "original segment") and to one segment in the updated version (an "updated segment"), wherein content of the original segment is copied to the updated segment. The original and updated segments are considered as corresponding segments. After performing a copy operation (in accordance with a copy command), the area previously occupied by the original segment is considered free, thus it is allowed to write other content therein. It is noted that the update process does not need to physically delete (free) the content. It can only mark this area as free. In addition, similarly to the insert command, there are some embodiments, wherein inserted content that is written into a non-free area (i.e., physical area that includes content that was not freed before, for example, by a delete command), overrides the non-freed content, which is therefore considered as deleted. In these embodiments such a copy command is considered as equivalent to a delete command followed by a copy command.

A "replace" command replaces content of an original segment with new content in the update version and hence it corresponds to one original segment and to one updated segment. The content of the original segment is deleted while supplementary data (such as data stored in the replacements supplementary data portion, 419, of FIG. 4 below) is written into the updated segment. However, those versed in the art would appreciate that there are transforming functions, such as bitwise XOR (exclusive or), that transform data to another in a reversible manner. For example, it is possible to bitwise XOR the content of the original segment with data ("transforming data") that yields the content of the updated segment. Those versed in the art would appreciate that it is later possible to bitwise XOR the updated content with the transforming data to yield back the original content (bitwise XOR is a mathematically revertible function, i.e. if "A XOR B=C" than "C XOR B=A"). In an embodiment using transforming functions to replace content the supplementary data can include the transforming data.

It is noted that the exemplary commands described above are non-limiting and there may be additional types of update commands (such as "backup") or fewer types of update commands in an update package. For example, it should be appreciated that instead of a "replace" command it is possible to use a combination of "delete" and "insert" as was previously explained. According to a different example there can exist a simple update package that instructs the update process only to delete one segment (and hence this package does not include any insert, copy and replace commands), etc.

There are storage devices 103 that permit accessing content (for reading and/or for writing) stored in one block at a time. In an update package adapted for such a storage device, the commands corresponding to a single block should better be organized in groups, wherein the commands in each group correspond to one block and do not include commands corresponding to other blocks interweaved in between. Doing this the update process can access in one read operation all the original content that is required from the original block or access in one write operation all the updated content that is required to the updated block. Interweaving commands that correspond to different blocks in an update package adapted to such a storage device, whenever the update process performs an operation in accordance with a command it accesses the whole block, although it actually requires access to a segment thereof.

Figure 2:
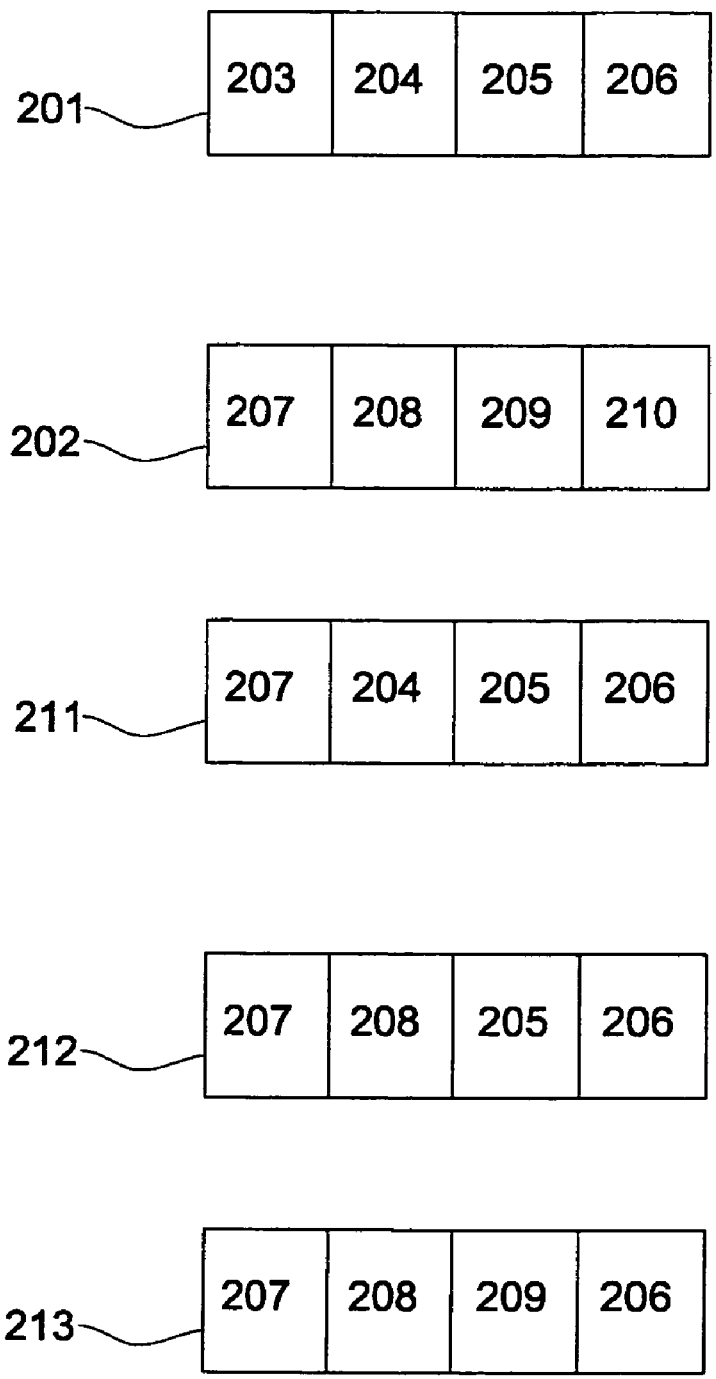
FIG. 2 demonstrates simplified exemplary stages in updating an original version to an updated version.

Before turning to FIG. 2, it is noted that the term "stored version" is used for referring to the version currently stored in the storage device. The stored version can be, e.g., an original version, it can be an intermediate version, as illustrated, for example, with reference to FIG. 2 below, or it can be an updated version.

FIG. 2 illustrates simplified exemplary stages in updating an original version 201 to an updated version 202 in a storage device allowing access to whole blocks. The original version 201 includes four blocks, specifically these are 203, 204, 205 and 206. The updated version 202, according to this example, also includes four blocks, namely 207, 208, 209 and 210, wherein block 207 replaces block 203, block 208 replaces block 204, block 209 replaces block 205 and block 210 replaces block 206. According to the example, the update process first replaces block 203 with block 207. Thus, the stored version 211 includes a combination of the original version 201 and the updated version 202, wherein the first block is 207 (which belongs to the updated version) while the other blocks (i.e., 204, 205 and 206) still belong to the original version 201. Next, according to the example, the update process replaces block 204 with block 208, thus the stored version becomes 212. Then the stored version 213 is generated, and finally the stored version becomes the updated version 202. Versions that are partly original and partly updated (e.g., versions 211, 212, 213) are referred to as "intermediate versions".

It should be appreciated that the update process illustrated in FIG. 2 can terminate, normally or not, at any stage. Thus, the stored version stored in the storage device can be any of the versions 201, 211, 212, 213 or 202. Furthermore, since interruption may occur while storing content in an updated block, the last updated block at the point of interruption may be corrupted, that is, it may contain undefined content as is known to those versed in the art.

It should be noted that the example provided with reference to FIG. 2 is by no way binding. Original, intermediate and/or updated versions can include any number of blocks, a block can include any applicable number of bits and the update process can perform any operation applicable to the case apart or in addition to replacing blocks (such as deleting blocks, inserting blocks, moving blocks etc.).

In addition, in a storage device that allows access to portions of blocks, there can also exist original, updated and intermediate versions. However, in these cases FIG. 2 would illustrate segments instead of blocks.

Figure 3:
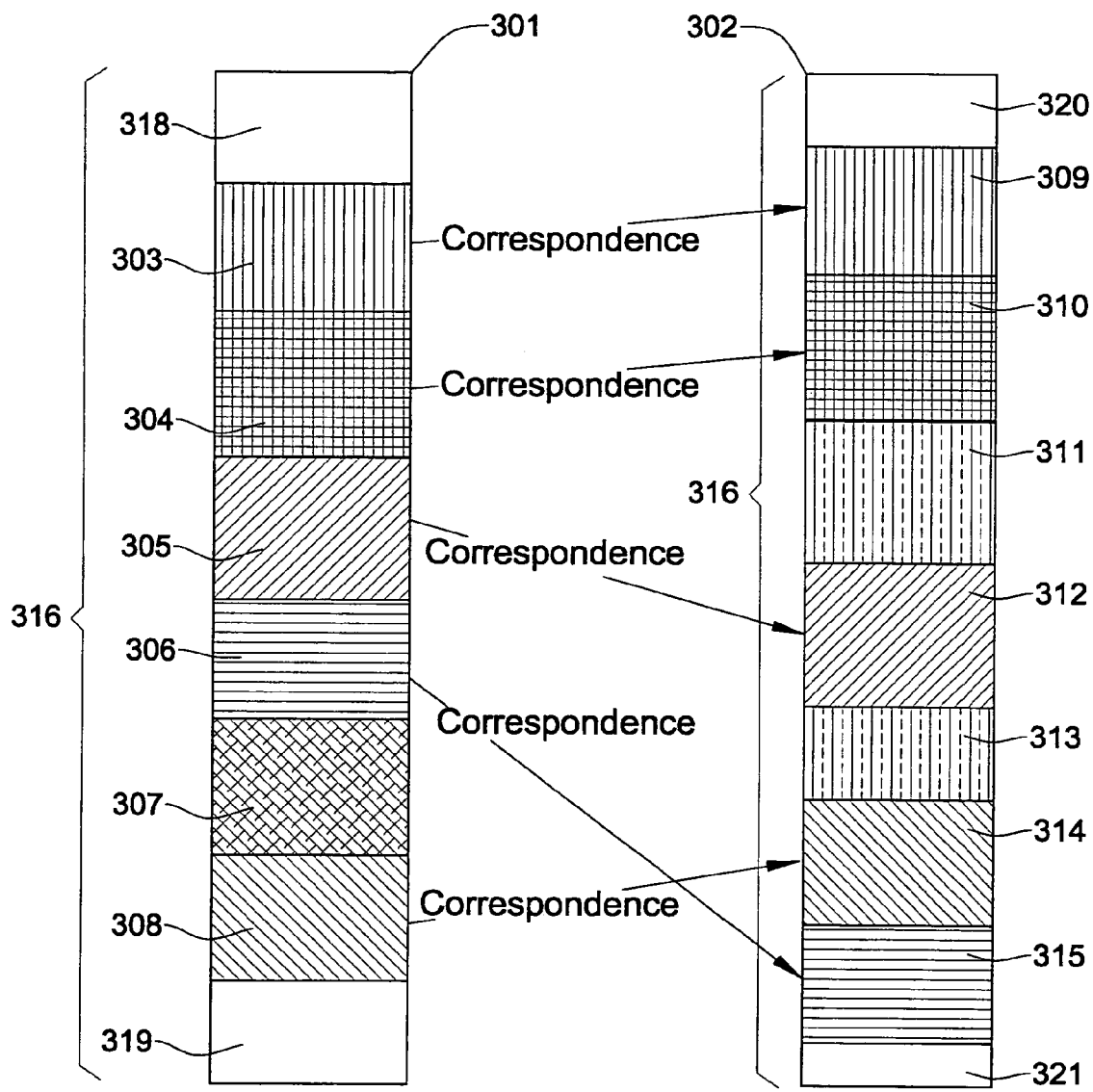
FIG. 3 demonstrates an exemplary original version and a corresponding exemplary updated version.

FIG. 3 illustrates an exemplary original version 301 and a corresponding exemplary updated version 302. The original version is sometimes also referred to as a "source version" while the updated version is sometimes referred to as a "target version". Segments 303, 304, 305, 306, 307 and 308 constitute together the original version 301, while segments 309, 310, 311, 312, 313, 314 and 315 constitute together the updated version 302. It is noted that the original version includes fewer segments compared to the updated version (six segments in the original version compared to seven segments in the updated version). Thus, the update process inserted new content (segments 311 and 313 in the example) into the updated version. In addition, it is noted that the content of segments 303, 305, 306 and 308 in the original version is identical to the content of segments 309, 312, 315 and 314 of the updated version, respectively. That is, the original content of these segments is copied into the corresponding segments in the updated version. Furthermore, the content of segment 307 of the original version is deleted thus it does not appear in the new version, while the updated content of segment 310 replaces the original content of segment 304.

In the example of FIG. 3 the original version 301 is stored in one block in the storage device, specifically, block 316. The update process is an in-place update process, that is, the updated version overrides the original version, hence the update version 302 is also stored in block 316. However, this is non-limiting and a version (an original and/or updated version) can be stored in more than one block as was previously explained, with reference to the "123456789" example. In addition, it is possible to see 301 and 302 as part of larger original and updated versions. Thus, the term "original version 301" and "updated version 302" refer to the versions as a whole, or to one block there from.

While looking at the figure it is illustrated that there are two free segments padding the original version 301 on both sides. Specifically, these are segments 318 and 319. There are also two free segments, 320 and 321 padding the updated version 302. It is noted that the free segments 318, 319, 320 and 321 are not part of the original or updated versions, instead they are unused spaces in the block 316, when occupied by the original or updated version. These free segments can sometimes be used for storing content which is part of other files. It is further noted that according to the example, the free segment 320 is smaller than the free segment 318, while the free segment 321 is smaller than the free segment 319. That is, the space occupied by the original version 301 is smaller than the size occupied by the updated version 302.

The segments 303 and 309 are corresponding segments. Similarly are 304 and 310; 305 and 312; 306 and 315; and 308 and 314.

Figure 4:
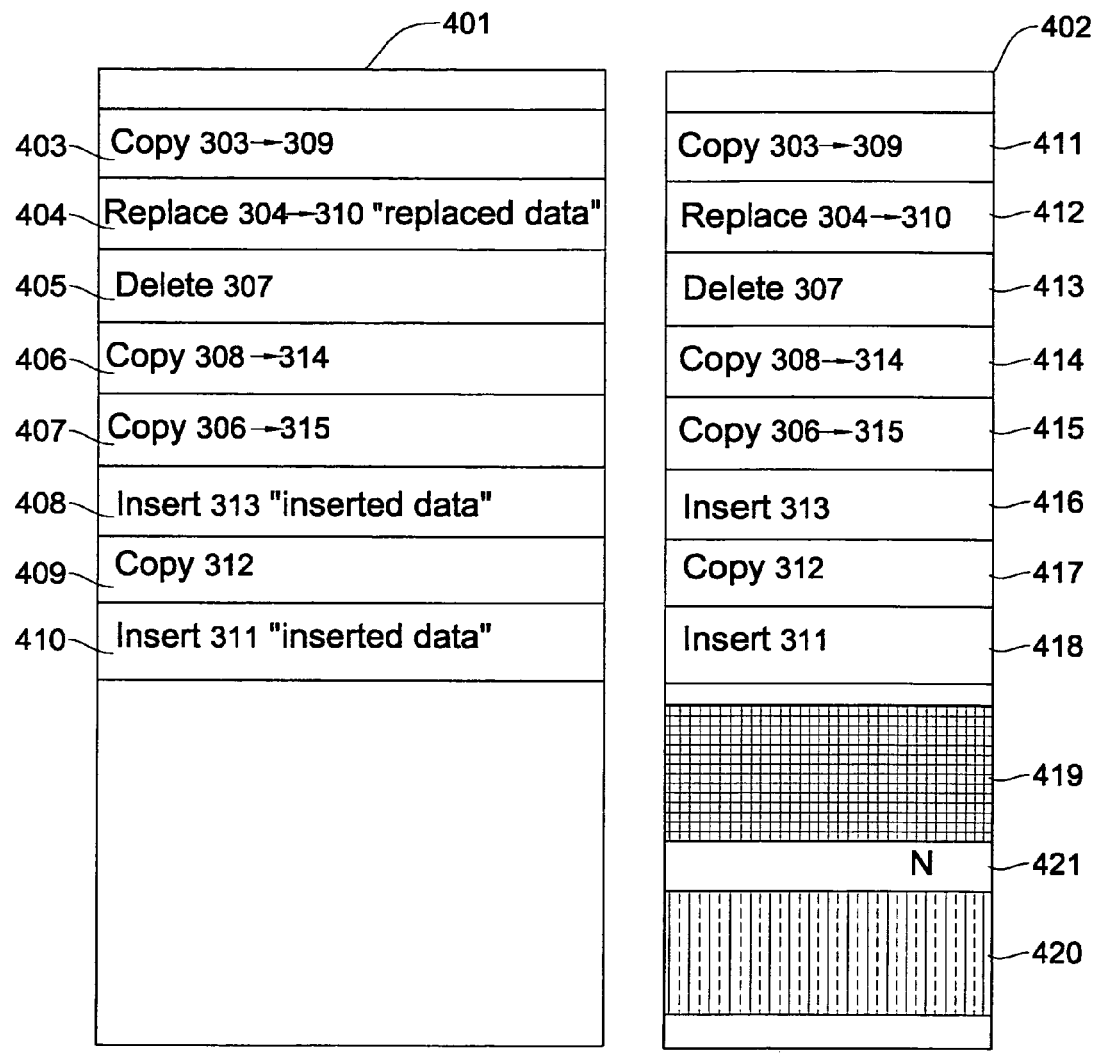
FIG. 4 demonstrates exemplary update packages adapted to update the original version of FIG. 3 to the updated version thereof.

FIG. 4 illustrates alternative update packages 401 and 402 adapted to update the original version 301 of FIG. 3 to the updated version 302 thereof. The update package 401 includes update commands for updating the version. The command 403 instructs the update process to copy the original content of segment 303 to the updated segment 309. The update command 404 instructs the update process to replace the original content of segment 304 with the "replaced data", thus yielding the updated content of the updated segment 310. It should be noted that it is also possible to use a transforming function, such as XOR in order to replace data, as was previously explained. In such an embodiment the "replaced data" would store the transforming data.

Command 405 is in charge for deleting the original content of segment 307; command 306 copies the original content of segment 308 to the updated segment 314; command 407 copies the original content of segment 306 to the updated segment 315; command 408 instructs the update process to insert the "inserted data" into the updated segment 313; command 409 instructs it to copy the original content of segment 305 to the updated segment 312; and command 410 is in charge of inserting the inserted data as the updated content of segment 311. It is noted that data provided to the update process, such as inserted and/or replaced data, are interweaved with the update commands of the update package 401. Such an update package, where data are interweaved with the update command is referred to as a "data indistinct update package" or "data interweaved update package".

It is noted that the order by which the update commands appear in the update package is not necessarily equivalent to the order of the respective segments in the original and/or updated versions. In addition, it is noted that if 301 and 302 are parts of an original an updated version then the update package includes additional commands, for updating additional segments of additional blocks. In this case 401 is part of an update package.

It is further noted that data such as "inserted data" and "replaced data" that are required for some update commands are generally referenced as "supplementary data". An update command that requires supplementary data is referenced as a "data consuming update command".

The update package 402 is an alternative update package (or a part thereof) that generates the updated version 302 from the original version 301. The update commands in the update package 402 are equivalent to the update commands of the update package 401, and ordered in the same order as they appear therein: command 411 is equivalent to command 403; command 412 is equivalent to command 404; command 413 is equivalent to command 405; command 414 is equivalent to command 406; command 415 is equivalent to command 407; command 416 is equivalent to command 408; command 417 is equivalent to command 409; and command 418 is equivalent to command 409. However, in the update package 402, unlike the update package 401, all the supplementary data required for insert and replace commands appear in the end of the update package. The portion 419 of the update package is used for storing supplementary data required for replace commands (hence it is referred to as a "replacements supplementary data portion"), while the portion 420 of the update package is used for storing data required for insert commands (hence it is referred to as an "insertions supplementary data portion"). Such an update package, where supplementary data are stored in supplementary data portions is referred to as a "data distinct update package".

It is noted that each supplementary data portion (such as portions 419 and 420) can include supplementary data items that correspond to more than one data consuming update command. In the example of FIG. 4, the insertions supplementary data portion 420 includes supplementary data of the update commands 416 and 418.

According to one embodiment, a data consuming update command can include a pointer to the respective supplementary data item that is stored in the update package, e.g., a pointer to the beginning of supplementary data item included in one of the portions 419 and 420. According to a different embodiment, each update command that requires supplementary data can include the size of the respective data, thus allows computing the position where the respective supplementary data item begins. This is non-binding and other embodiments are allowed as well. For example, the supplementary data portion can associate with each supplementary data item the size of this item. If the supplementary data items are stored in the supplementary data portion by the same order of the data consuming update commands in the update package, then a person versed in the art would appreciate that this embodiment allows computing the position where a supplementary data item, respective of each data consuming update command begins.

It would be appreciated by those versed in the art that original versions are updated to yield updated versions. Such an update (of an original version to an updated version) is referenced as "forward updating". In addition, those versed in the art would appreciate that while forwarded updating versions, an update package is processed from its beginning towards its end. Processing an update package from its beginning towards its end is referred to as "forward processing" of the update package.

According to the invention, it is sometimes required to reverse the direction of update, thus returning to the original version. Such a reverse is sometimes desired, for example, when the forward update process fails in the middle, thus yielding a stored version that is an intermediate version. A cellular operator, for example, may wish to return to the previous version (the original version) when such failure occurs.

According to another example, when an update process starts operating it can present a message to the user such as "the handheld is now updating software. The update is expected to last for 30 minutes during which the telephone will be inoperable". If the user must use his telephone within the coming 30 minutes he is given the option to cancel the update process (thus postponing it to some later time). However, the update process can perform part of the update task before the user presses cancel, which results in an intermediate version. Therefore, when the user presses "cancel" the update process has to reverse and return to the original version.

Returning from a stored version to its corresponding original version is referred to as "roll-back", while an update process that performs roll-back is referred to as a "rolling-back update process". According to one embodiment of the invention a rolling back update process can operate in accordance with the update package used for forward updating this original version, but in a reversed direction (i.e., from its end toward the beginning) as will further be explained in detail.

The examples provided are by no way limiting and other examples and reasons for roll-back exist as well. One such additional example is when a cellular operator successfully updates an original version to an updated version, however, the updated version is found non-satisfactory and therefore the operator would rather return (roll-back) to the previously operating original version. That is, roll-back does not require that the stored version would be an intermediate version; it can occur also when the stored version is an updated version.

Returning to the update package 402 of FIG. 4, 421 is a "direction indication", constituting "update attribute bits". The direction indication is used to indicate the direction by which the update process should operate, and/or the reason for this operation. For example, there can be different codes for the different directions and/or reasons of operation.

However, this is non-limiting and other embodiments can store the direction indication in other storage areas which are not necessarily part of the update package. For example, there can be a "direction indication buffer" in the storage device 103.

In accordance with certain embodiments the direction of the update is one of two directions. Specifically, the direction is one of forward and roll-back. This is non-limiting and other embodiments can have any direction applicable to the case.

When an update process, operating in accordance with one embodiment of the invention starts operating, it needs to identify the direction of operation and the start position. It is noted that when a forward update initially begins, the stored version is normally the original version, the start position is the beginning of the original version and the beginning of the update package, and the direction is forward (as was already noted). However, if the stored version is an intermediate version, the start position would be somewhere along the intermediate version and along the update package. Similarly, the direction can be either forward or roll-back.

Returning to FIG. 3, it was already mentioned that during the update process several segments were modified (therefore constituting "replaced blocks" or "inserted blocks"). It was also explained with reference to FIG. 4 that the content of the modified segments is provided with the update package used by the update process. Thus, it is possible to predict what should be the content of an updated segment, based on the update package.

According to one embodiment, therefore, it is possible to include in the update package signatures corresponding to the modified portions in the update segments. A signature, for example, can be a known per se checksum computed for the specific block. The signatures can be stored together with their corresponding blocks. However, alternative embodiments are allowed as well, such as storing signatures in the beginning or end of the update package, in separated tables etc.

It was also explained (e.g., with reference to FIGS. 3 and 4) that content of some segments is copied from the original version to the updated version. Therefore, given an original version and an update package, it is possible to compute signatures for all segments in the updated version. Furthermore, it is possible to compute one signature that corresponds to all the segments in a block that are part of the updated version. Such a signature is referred to as a "block's updated signature".

It is further possible, according to the embodiment, to calculate a "block's original signature", that is, a signature that corresponds to all the segments in a block that are part of the original version.

Understanding this, and bearing in mind the explanation that a stored version can be either an original version, an intermediate version or an updated version (see, for example, FIG. 2), a person versed in the art would appreciate that by calculating signatures of blocks in the stored version and comparing them with the blocks' original signatures and with the blocks' updated signatures it is possible to determine the identity of the stored version. Furthermore, if the stored version is determined to be an intermediate version, it is possible to determine the position of interruption of the previously running update process. Then it is possible to locate the update command in the update package that corresponds to the position of interruption.

In storage devices that allow access to content that occupies part of a block it is further possible to compare segments' signatures, in order to determine the segment where interruption of the previously running update process occurred.

It is further possible to associate with the update package records referenced as "state records". According to one embodiment it is possible to associate a state record with commands corresponding to each block, wherein the state record reflects the state of the update process, as it should be after the update of the corresponding block is completed. For example, the state-record can include a copy of the block in RAM used by the update process to hold variables that maintain the process, such as known per se local variables.

After determining the identity of the stored version, the position of interruption of the previously running update process and the state record, it is possible, according to one embodiment of the invention, to reverse (or revert) the update process, thus returning to the original version that existed before the previously running update process started running.

Figure 5:
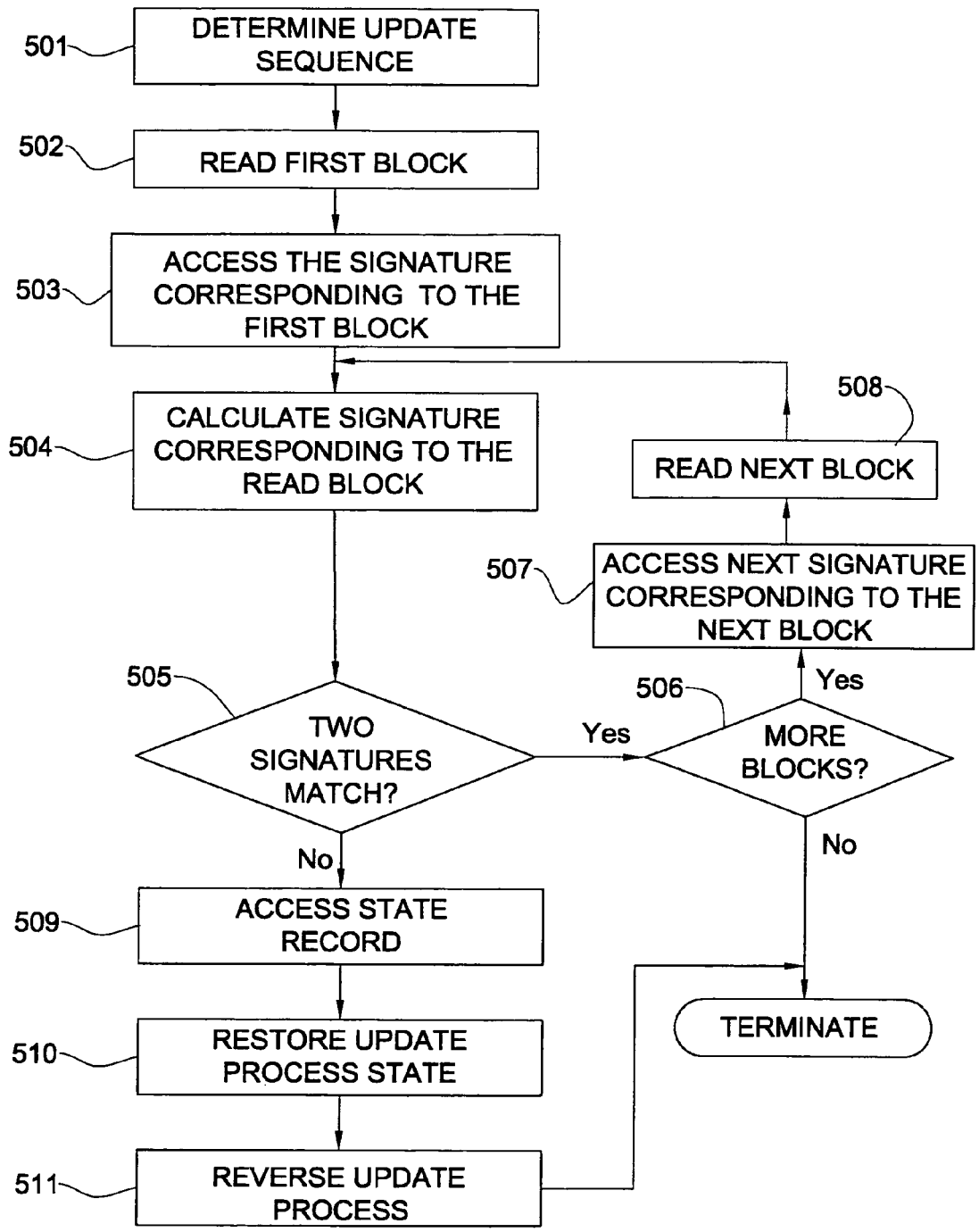
FIG. 5 is a flowchart illustrating operations performed before reversing an update process, according to an embodiment of the invention.

FIG. 5 is a flowchart illustrating operations performed before reversing an update process, according to an embodiment of the invention. In 501 the update sequence is determined in accordance with the update package and in 502 the update process reads the first block of the stored version in accordance with the update sequence. In 503 the signature corresponding to the read block is accessed (e.g., by reading it from the update package) and a corresponding signature is calculated in 504, based on content read in 502. If in 505 the update process identifies that the two signatures match and as long as there are other, un-examined blocks (see 506), the signature corresponding to the next block in accordance with the update sequence is accessed in 507 and in 508 the block is read in order to calculate its corresponding signature in 504. If in 506 it is found that there are no more un-examined blocks, this means that the stored version is an updated version and the update process terminates without reversing. It is noted though that this is non-limiting and other embodiments can reverse even a stored version, which is an updated version.

When in 505 the two signatures do not match, the update process can access the state record that corresponds to the read block, as done in 509, in order to restore the process state in 510. Once the state has been restored, the process reverses in 511 in order to return to the original version.

It is noted that according to one example, while updating a block the update process stores its original content in a backup buffer to allow restoring its content if the update process fails before the block's update is complete ('backup-first'). A different example can store the updated block's content in the backup buffer ('update-first') without incurring changes to the block itself, instead of the original content, and then copy the updated content from the backup buffer to the block. In the backup-first case, when locating the point of interruption it is possible that the content of this block is corrupted. In this case the content can be recovered from the backup buffer. Alternatively, in case of 'update-first', the new content already exists in the backup buffer.

It is noted that FIG. 5 is non-binding. In an alternative embodiment the signatures in the update package can correspond to blocks in the original version instead of the updated version. Those versed in the art will appreciate that instead of comparing signatures locating the point of interruption by looking to the first block in the stored version whose signature does not match to the corresponding signature in the update package, in this alternative embodiment it is required to look for the first block in the stored version whose signature does match to the corresponding signature in the update package, wherein the point of interruption is the previous block in the stored version, according to the update sequence.

It was previously described that roll-back is sometimes performed due to user (hand-held owner) selection etc. In case of owner's initiated roll-back, it is not necessarily required to search for the start position. According to one embodiment of the invention, when canceling an update process it is possible to store an indication of the start position (the indication can be stored, for example, in association with the direction indication).

Before turning on to describe how reversal can be performed, it is noted that it is also possible to reverse a rolling-back update, thus yielding a forward update. For example, if an owner cancels a forward update (thus starting a roll-back), he can change his mind and reverse the update process again (by canceling the rolling-back update process), thus returning to the forward update, which results with an updated version. That is, according to one embodiment, when canceling an update process it is possible to "toggle" between forward and roll-back direction indications.

It is noted that because the term 'reversal' explains reversal from forward updating to rolling-back and vice versa the update process operating before the reversal is referred to as pre-reversal update process and the one operating after the reversal is referred to as post-reversal update process. It should be understood that if the pre-reversal update process performs forward update, then the post-reversal update process performs roll-back. The contrary is also correct: if the pre-reversal update process performs roll-back, then the post-reversal update process performs forward update.

Similarly, the stored version that exists before the update process (forward-update or roll-back) starts operating is generally referred to as source version, while the stored version that the update process is generally referred to as a "target version". The source version can be an original version, an updated version or an intermediate version. The target version can be either an original version or an updated version.

Figure 6:
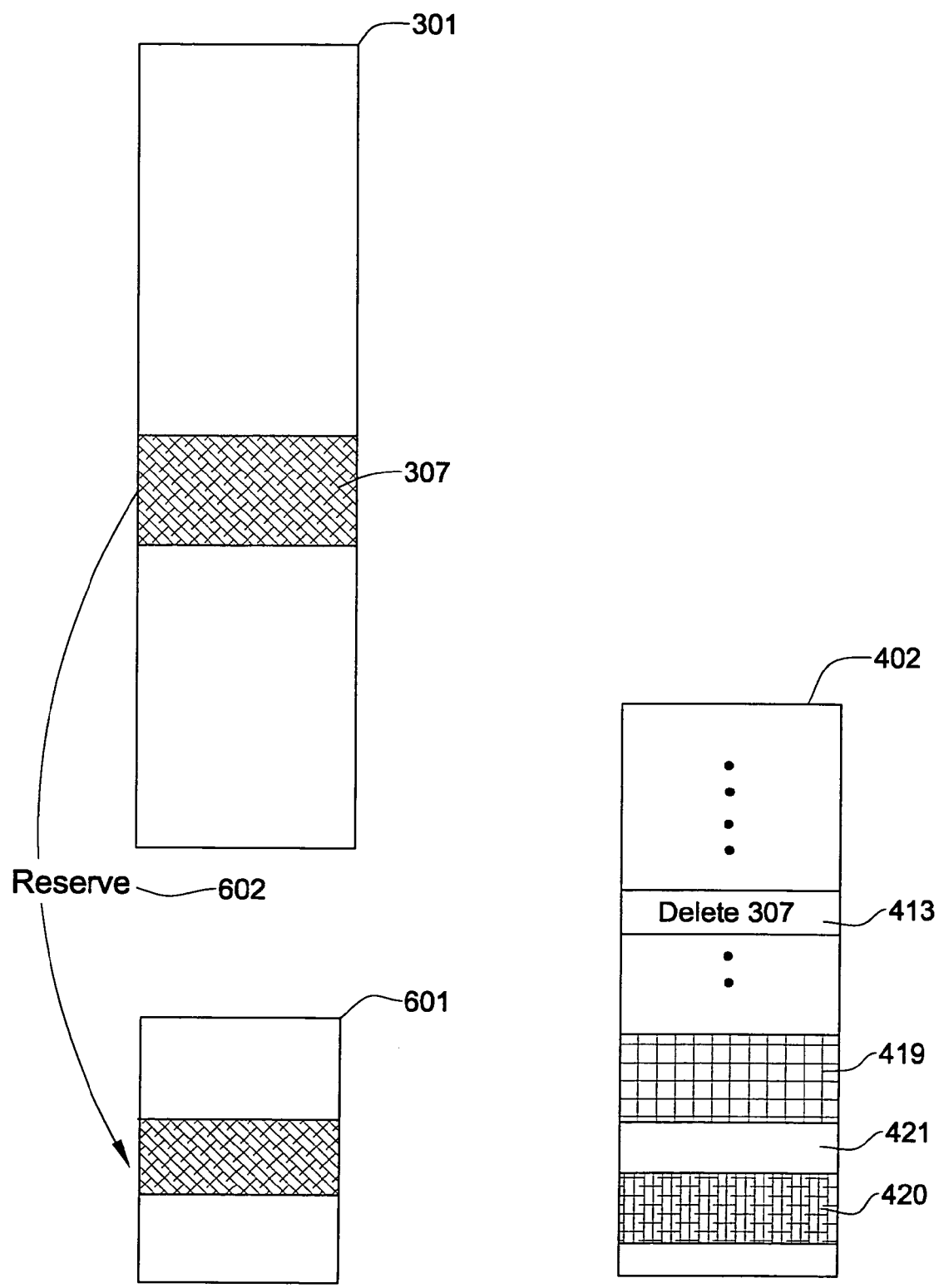
FIG. 6 demonstrates by way of example storing deleted content, according to one embodiment of the invention.

According to one embodiment of the invention, in order to allow reversal (from forward updating to rolling-back and vice versa), it is required to backup any content deleted during the pre-reversal update process, as it will be necessary to re-introduce this content into the target version. FIG. 6 illustrates by way of example storing deleted content during a pre-reversal update process, according to one embodiment of the invention. In the figure, there is illustrated one segment 307 of the original version 301 (see FIG. 3), which is the source version in this example. There is also illustrated a portion of the update package 402 of FIG. 4, wherein the illustrated portion includes the delete update command 413, in charge for deleting segment 307. The portion also includes the replacements supplementary data portion 419, the insertions supplementary data portion 420 and the direction indication 421.

In addition, a "content reserve buffer" 601 is illustrated. The content reserve buffer, constituting a "save buffer", is an area in the storage device 103 accessible to the update process, that is specially allocated in order to allow reserving deleted content. According to one embodiment the content reserve buffer 601 can be allocated temporarily only for the duration of the update process and be reused afterwards for any other task. Before deleting content during the update process, it is possible to reserve (602) a copy thereof in the content reserve buffer. Alternatively, it is possible to dedicate space in the update package for the content reserve buffer, thus ensuring that there is enough space in the storage device 103 for this buffer, in the cost of a larger update package (which requires more bandwidth and/or more time to transmit, compared to a smaller update package).

It is noted that FIG. 6 illustrates reserving content during a delete operation. However, this is non-limiting and according to some embodiments reserving should occur whenever the update process performs an operation that overrides content, such as "replace", in order to allow for a later reversal of the advancing update process. It is further noted that embodiments operating a transforming function while performing a "replace" operation, can avoid reserving the stored content before overriding it with the replacing content, because the transforming data can be re-applied to the replacing content in order to re-transform it back to content identical to the stored content.

The embodiment of FIG. 6 is non-binding and alternative embodiments are allowed as well. For example, it is possible to include a copy of the deleted data in the update package. This way more network resources will be required in order to transmit the update package (which becomes even larger), yet, the update process will be faster, as no reserve operations are required.

Figure 7:
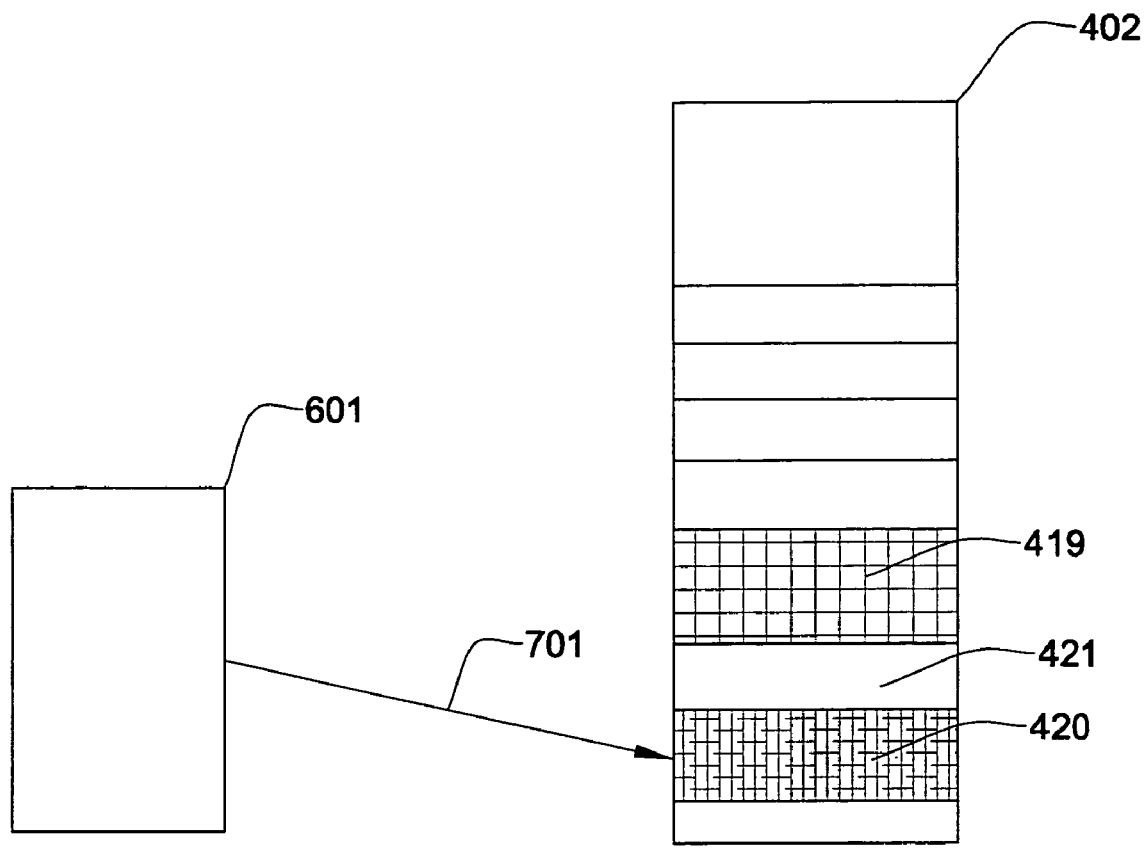
FIG. 7 demonstrates by way of example reducing usage of a content reserve buffer, according to one embodiment of the invention.

FIG. 7 illustrates by way of example reducing usage of a content reserve buffer, according to one embodiment of the invention. It is noted that supplementary data items used for insertion and replacement commands in the pre-reversal update process are not required after performing their respective update commands as their supplementary data is already written into the target version. Yet, it was already explained that content deleted during the advancing update process is reserved, e.g., in the content reserve buffer. Thus, it is appreciated that the content stored in the content reserve buffer can be copied (701) into the update package, in-place of the already used supplementary data 420, allowing to free (and/or re-use) the content reserve buffer thereby.

As suggested by the latter example of FIG. 7, the update package itself can be updated in-place, which may require a reliable modification method for modifying its storage area in case the update process is interrupted. Reliable in-place modification of the update package can use any reliability technique, such as using a backup buffer, package signatures and state records as was previously explained.

According to one embodiment of the invention it is possible to replace the supplementary data items whenever they become "free" (i.e., substantially immediately after using each one of them). According to a different embodiment it is possible to replace the supplementary data items at a later time, e.g., upon termination of the update process.

It should be appreciated that sometimes there are two or more deleted segments, whose content (or al least part of their content) is similar or shared. According to an alternative embodiment, when two or more segments share content, this content can be reserved only once, while the other occurrences can reserve an indication as to where the reserved content is stored or how to retrieve it.

When the pre-reversal update process terminates, the direction indication 421 is set to indicate which direction should a preceding update process operate, if such an update process initiates. It is noted that if the pre-reversal update process fails, or stopped in the middle, it also sets the direction indication 421, to indicate whether the preceding update process (if initiated) should operate in a forward or roll-back mode (such as in FIG. 5, 511).

According to the invention, reversing a forward update process is performed by undoing each of the update commands performed by the forward update process but in a reversed order, starting from the last update command performed by the forward update process, and terminating with the first update command in the update package. Similarly, reversing a rolling-back update process is performed by redoing each of the update commands, whose reversing command was performed by the rolling-back update process, starting from the last reversed-update command performed by the rolling-back update sequence.

Reversing will be further explained with reference to the example previously presented in FIGS. 3 and 4. According to the example it is assumed that the forward update process operated successfully and yielded the updated version 302 by updating the original version 301 in accordance with the update package 402. It is noted that following this successful forward update the direction indicator 421 indicates that the update process direction should be reversed (i.e., the preceding update process, if initiated, will operate as roll-back).

According to the example, the rolling-back update process undoes the update operations done by its preceding forward update process, but in a reversed order: starting from the last update command executed before the advancing process terminated and terminating with the first update command 411. In the is example, the first update command to be undone by during roll-back is 418. It is noted that while reversing an update process, the supplementary data portions (420 and 421 in the figure) are also accessed in a reversed order.

According to the example, the supplementary data portions include reserved content written thereto while deleting content during the forward update. Understanding that a rolling-back update behaves like a forward update (apart from the reversed direction of progress and the reversal of the commands), it should be appreciated that whenever the rolling-back update process deletes content from the stored version, a copy of the deleted content is written into the supplementary data portions (or into the content reserve buffer).

The following example explains how each of the exemplary update commands (copy, delete, insert and replace) can be undone by performing an appropriate operation (a "reversing update command" or "reverting operation"), which reverses the original operation's result:

A "delete" operation can be undone (or rolled-back, reversed) by an insert operation. The content previously deleted by the delete command is the supplementary data for the insertion command. For example, the delete operation performed by the command delete 307 (see, for example, command 413) is reversed by insert 307 supplementary-data (wherein the supplementary data can be store in the supplementary data portion or in the content reserve buffer).

An "insert" operation performed in accordance with an "insert" command can be undone by a delete operation. For example, command 418 (insert 311) can be undone by performing delete 311. It is noted that when deleting content while performing the reversing command, the deleted content should be reserved, e.g. in the content reserve buffer or in the insert supplementary data portion.

A "copy" operation can be undone by copying the updated segment back to its original position. For example, the command 417 (copy 305→312) can be reversed by the command copy 312→305.

A "replace" operation can be undone by deleting content inserted by the pre-reversal update process and writing instead data stored in the replacements supplementary data portion 419 or in the content reserve buffer. In other words, a replace operation can be undone by another, reversed, replace operation. However, those versed in the art would appreciate that if a transforming function such as bitwise XOR is used for 'insert' in the pre-reversal update process, then the insert operation can be reversed by operating the same transforming function on the content previously written by the pre-reversal insert operation using the supplementary data (transforming data), in order to yield back the content stored in the pre-reversal segment.

It is thus illustrated that a reversed update command (or a rolling-back update command) reversely corresponds to an update command.

Figure 8:
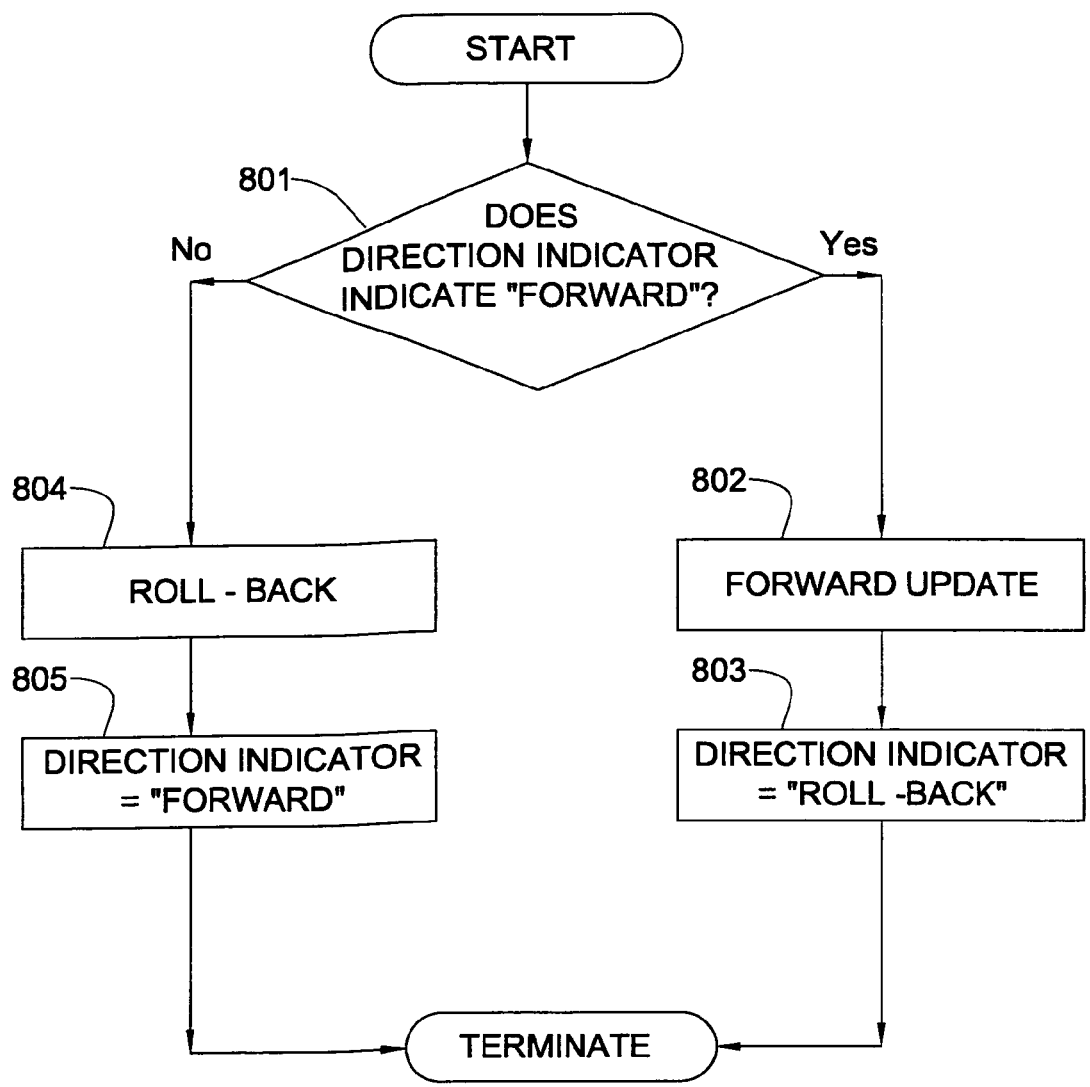
FIG. 8 is a flowchart illustrating the main procedures performed while updating an original version to an updated version in a reversible update process, according to one embodiment of the invention.

FIG. 8 is a flowchart illustrating the main procedures performed while updating a source version to a target version in a reversible update process, according to one embodiment of the invention. It is noted that the direction of the update process is determined in 801 in accordance with the value of the direction indicator 419. If the indicator indicates that the update process should operate as forward update, then the update process will operate in 802 in accordance with the update package in a forward direction. Upon termination (normal termination or failure), in 803, the update process will set the direction indicator to indicate that a preceding update process, if initiated, should perform roll-back. However, if the update process determines in 801 that the update process should operate to perform roll-back, then it will operate in 804 in accordance with the update package in roll-back direction. Upon termination (normal termination or failure), in 805, the update process will set the direction indicator to indicate that a preceding update process, if initiated, should perform forward-update.

Figure 9:
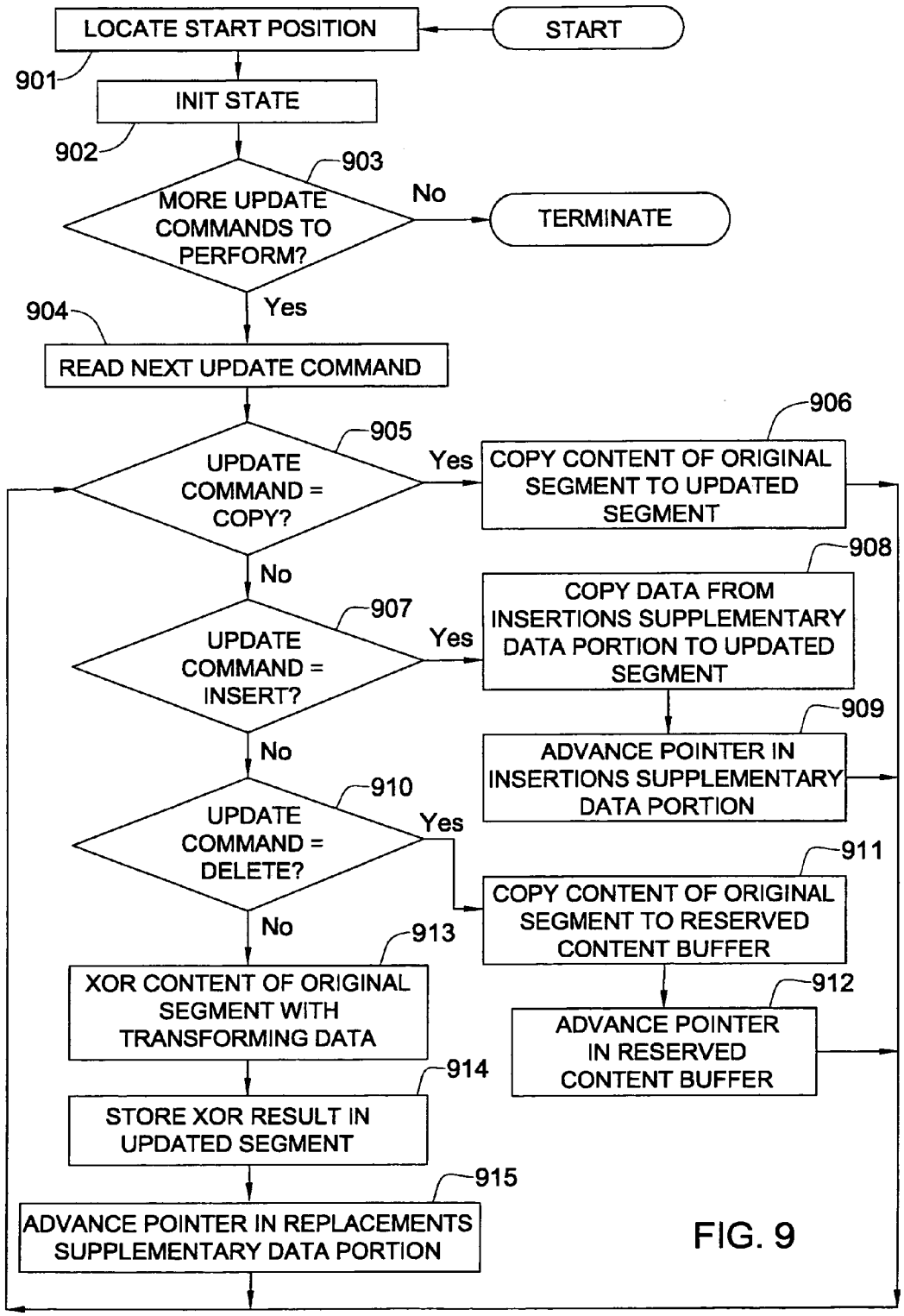
FIG. 9 is a flowchart illustrating in detail forward-updating a stored version, according to one embodiment of the invention.

FIG. 9 is a flowchart illustrating in detail a forward update process, according to one embodiment of the invention. Upon start, in 901, the update process has to locate the position in the stored version where it should start updating. It is appreciated that if the stored version is the original version then the start position is the beginning of the version, if the stored version is the updated version then the start position is the end of the version (hence the forward update process will terminate without performing any update operation), and if the stored version is an intermediate version then the start position is in the termination point of the previously running update process (see, for example, FIG. 5).

In 902 the update process initiates the process state. If the stored version is an intermediate version then the state would be initiated in accordance with the state record. However, if the stored version is an original or updated version then the state would be initiated as new. In addition, at this stage the update process locates the update command from where it should start reading, and it determines pointer positions such as in the replacements supplementary data portion 419, the insertions supplementary data portion 420 and the content reserve buffer 601, thus allowing it to access (for reading and/or writing) the correct data items stored therein.

It is illustrated in 903 that if the stored version is an updated version, and remembering that the update process is a forward update process, then there are no more update commands in accordance with the update sequence, and therefore the update process terminates without performing any update command. However, if the stored version is an original version or an intermediate version then the update process reads from the update package the next update command in accordance with the update sequence and operates accordingly. If the update command is a 'copy' command (905) the content of the original segment is copied into the updated segment in 906. It is noted that when the target segment is not free, there are some embodiments that require reserving the content stored therein in the content reserve buffer (or in the insertions supplementary data portion 420), as if there is a delete command before the copy command.

If the command is an 'insert' command (907) then in 908 data is copied from the insertions supplementary data portion 420 into the updated segment and in 909 the pointer in the insertions supplementary data portion is advanced to the next data item. Again, there may be some embodiments wherein before inserting the supplementary data into the updated segment, if the updated segment is not free, content stored therein is reserved in the content reserve buffer (or in the insertions supplementary data portion 420), as if there is a delete command before the copy command.

If the command is a 'delete' command (910) then in 911 the content stored in the original segment is copied into the content reserve buffer (or into the insertions supplementary data portion 420), and in 912 the pointer to in the content reserve buffer is advanced to the next available space.

According to the example (where there are 'copy', 'insert', 'delete' and 'replace' commands), those versed in the art would appreciate that if the update command is neither 'copy', nor 'insert' nor 'delete', it must be 'replace'. Therefore, in 913 the content of the original segment is bitwise XORed with the transforming data, wherein the result is stored in the updated segment (see 914) and the pointer to the next data item in the replacements supplementary data portion 419 is advanced to the next data item.

Figure 10:
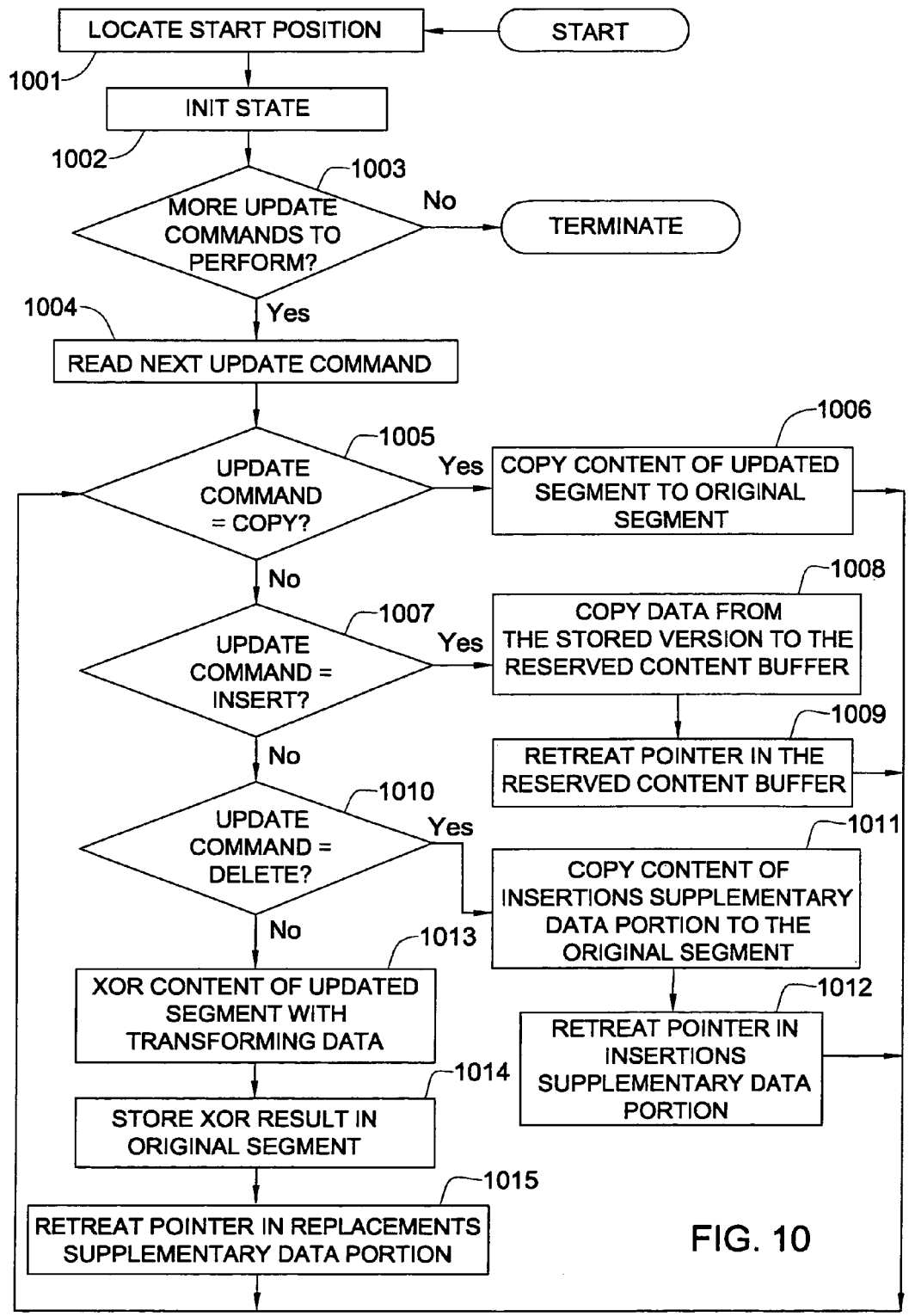
FIG. 10 is a flowchart illustrating in detail rolling-back a stored version, according to one embodiment of the invention.

FIG. 10 is a flowchart illustrating in detail rolling-back a stored version, according to one embodiment of the invention. Upon start, in 1001, the update process has to locate the position in the stored version where it should start updating. It is appreciated that if the stored version is the original version then the start position is the beginning of the version (hence the rolling-back update process will terminate without performing any update operation), if the stored version is the updated version then the start position is the end of the version, and if the stored version is an intermediate version then the start position is in the termination point of the previously running update process (see, for example, FIG. 5).

In 1002 the update process initiates the process' state. If the stored version is an intermediate version then the state would be initiated in accordance with the state record. However, if the stored version is an original or updated version then the state would be initiated as new. In addition, at this stage the update process locates the update command from where it should start reading, and it determines pointer positions such as in the replacements supplementary data portion 419, the insertions supplementary data portion 420 and the content reserve buffer 601, thus allowing it to access (for reading and/or writing) the correct data items stored therein.

The rolling-back update process operates in accordance with a roll-back update sequence, which is opposite to the update sequence of the update package. It is illustrated in 1003 that if the stored version is an original version, and remembering that the update process is a rolling-back update process, then there are no more update commands in accordance with the roll-back update sequence, and therefore the update process terminates without performing any update command. However, if the stored version is an updated version or an intermediate version then the roll-back update process reads from the update package the next update command in accordance with the reversed update sequence (or in other words: the previous update command in accordance with the update sequence) and performs the update operation reversely corresponding to the update command.

If the update command is a 'copy' command (1005) the content of the updated segment is copied into the original segment in 1006, which is the update command reversely corresponding to the 'insert' command. It is noted that when the original segment is not free, there are some embodiments that require reserving the content stored therein in the content reserve buffer (or in the insertions supplementary data portion 420), as if there is a delete command before the copy command, in accordance with the roll-back update sequence).

If the command is an 'insert' command (1007) then in 1008 data is copied from the stored version to the content reserve buffer (or to the insertions supplementary data portion 420), which is the update command reversely corresponding to the 'insert' command, and in 1009 the pointer to the content reserve buffer is advanced to the next available space (alternatively the pointer to the insertions supplementary data portion is retreated to the previous data item).

If the command is a 'delete' command (1010) then in 1011 data is copied from the insertions supplementary data portion 420 (or from the content reserve buffer) into the original segment, and in 1012 the pointer in the insertions supplementary data portion is retreated to the previous data item. Again, there may be some embodiments wherein before copying the supplementary data into the original segment, if the original segment is not free, content stored therein is reserved in the content reserve buffer (or in the insertions supplementary data portion 420), as if there is an insert command before the delete command, in accordance with the roll-back update sequence).

According to the example (where there are 'copy', 'insert', 'delete' and 'replace' commands), those versed in the art would appreciate that if the update command is neither 'copy', nor 'insert' nor 'delete', it must be 'replace'. Therefore, in 1013 the content of the updated segment is bitwise XORed with the transforming data, wherein the result is stored in the original segment (see 1014). According to the embodiment the transforming data is stored in the replacements supplementary data portion 419. Therefore, in 1015 the pointer to the next data item in the replacements supplementary data portion 419 is retreated to the previous data item.

The invention provides for a method for providing an update process of a stored version. The method comprising:

providing a forward update for updating the stored version to a first version;

providing a roll-back update for updating the stored version to a second version;

applying a first update operation being either of said forward update and said roll-back update; and applying a second update operation being either of said forward update and said roll-back update and being other than said first update operations.

It is appreciated that in accordance with certain embodiments the first version can be one of several versions, including original version and updated version. However, this is non-limiting and other embodiments may have a different version being the first version, such as an intermediate version.

Similarly, it is appreciated that in accordance with certain embodiments the second version can be one of several versions, including original version and updated version. However, this is also non-limiting and other embodiments may have a different version being the second version, such as an intermediate version.

In addition, it is appreciated that in accordance with certain embodiments the first update operation can be one of several update operations, such as forward update operation and roll-back update operation. This is non-limiting and other embodiments may have different update operation being the first update operation.

It is also appreciated that in accordance with certain embodiments the second update operation can be one of several update operations, such as forward update operation and roll-back update operation. This is non-limiting and other embodiments may have different update operation being the second update operation.

Figure 11:
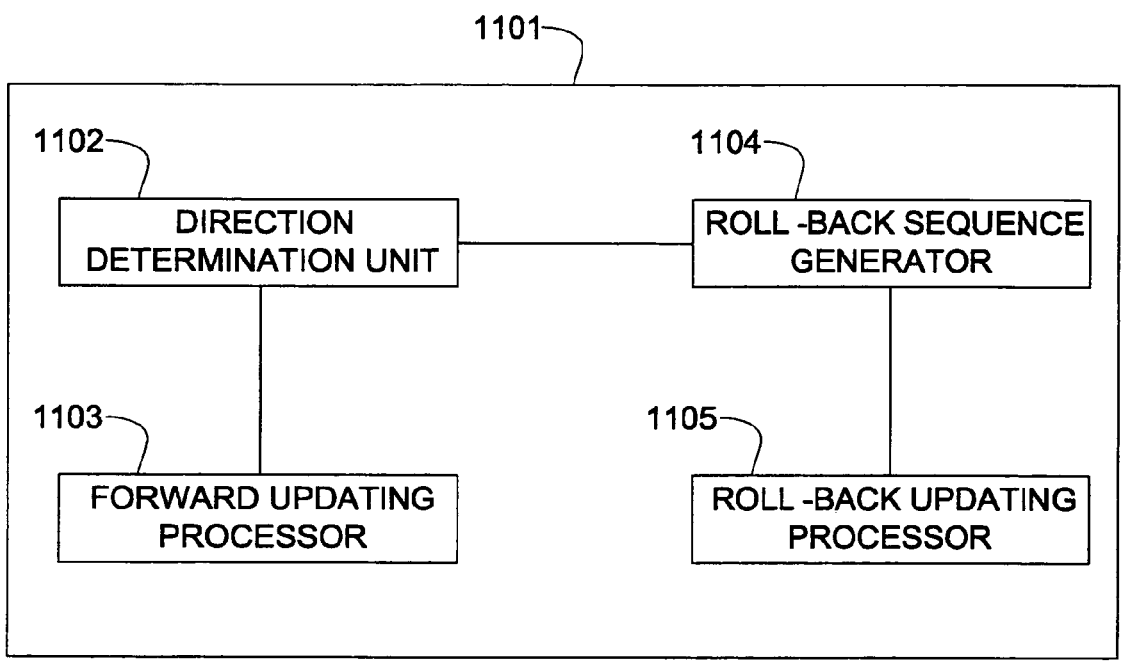
FIG. 11 is a block diagram schematically illustrating a system for updating a stored version of content stored in a storage device, according to one embodiment of the invention.

FIG. 11 is a block diagram schematically illustrating a system 1101 for updating a stored version of content stored in a storage device, according to one embodiment of the invention. The system 1101 includes a direction determination unit 1102 adapted for determining direction of the updating, for example, in accordance with the direction indication 421.

The system 1101 also includes a forward updating processor 1103 coupled to the direction determination unit 1102. When the direction determination unit 1102 determines that the direction of the updating is indicative of forward, the forward updating processor 1103 forward-updates the stored version to the updated version in accordance with the update sequence. This is done, for example, in accordance with the flowchart of FIG. 9.

When the direction determination unit 1102 determines that the direction of the updating is indicative of roll-back, a roll-back sequence generator 1104 that is coupled to the direction determination unit 1102 generates a roll-back update sequence opposite to the update sequence. The roll-back sequence generator 1104 can follow the update sequence in a reversed order, one command at a time. Alternatively it can follow the update sequence altogether, thus generating and storing the roll-back update sequence in the storage device, e.g., as a list.

The system 1101 also includes a roll-back updating processor 1105 coupled to the roll-back sequence generator 1104. The roll-back updating processor 1105 rolls-back the stored version to the original version in accordance with the roll-back update. This is done, for example, in accordance with the flowchart of FIG. 10.

Figure 12:
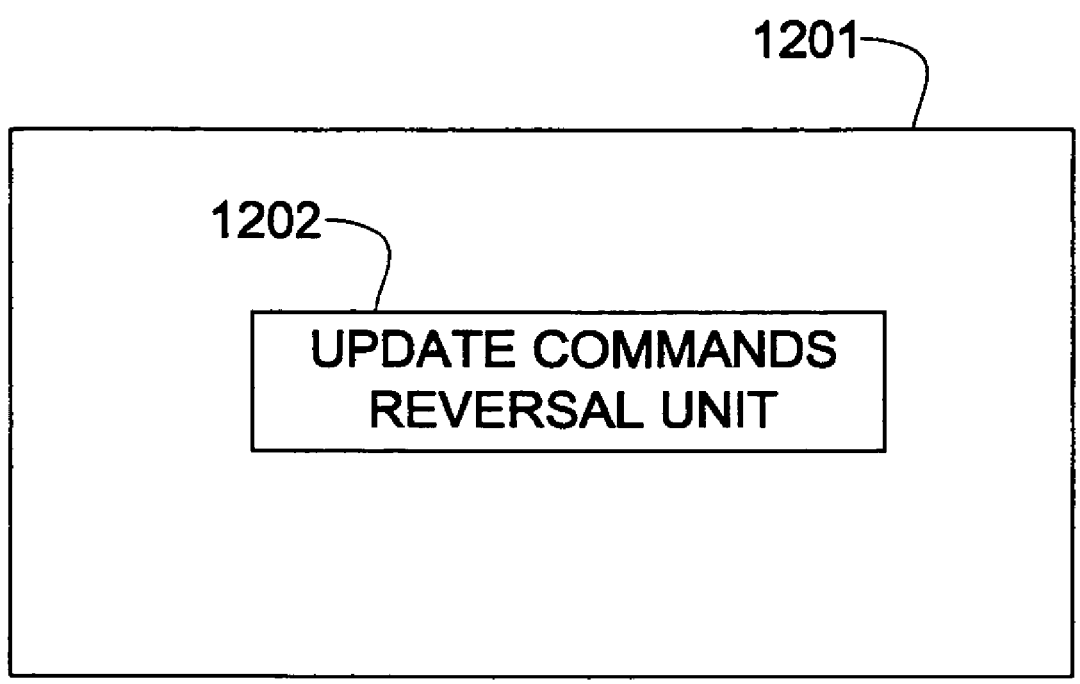
FIG. 12 is a block diagram schematically illustrating a system for reversing an update process, according to one embodiment of the invention.

FIG. 12 is block diagram schematically illustrating a system for reversing an update process, according to one embodiment of the invention. The system 1201 includes an update commands reversal unit 1202. The update commands reversal unit 1202 reverses update commands in the update package that were previously performed during updating. See, for example, 1006, 1008, 1011 and 1013 in FIG. 10.

Figure 13:
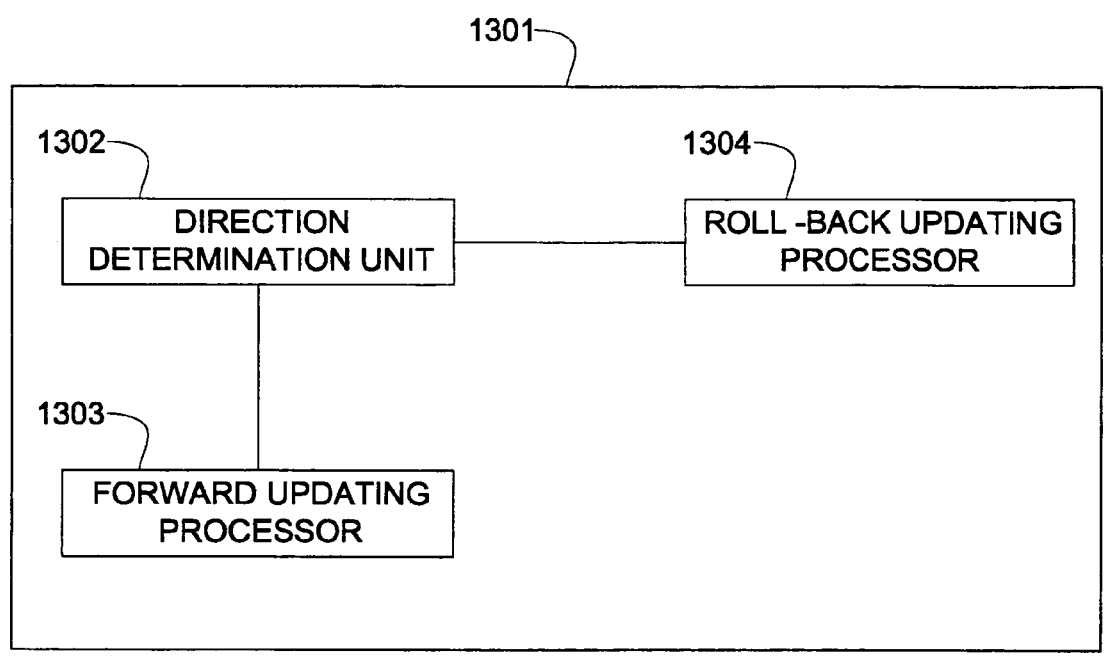
FIG. 13 is a block diagram schematically illustrating a system for updating a stored version of content stored in a storage device, according to another embodiment of the invention.

FIG. 13 is a block diagram schematically illustrating a system 1301 for updating a stored version of content stored in a storage device. The system 1301 includes a direction determination unit 1302. According to one embodiment, the direction determination unit 1302 uses the direction indication in order to determine direction.

A forward updating processor 1303 is coupled to the direction determination unit 1302. When the direction is indicative of forward, the forward updating processor 1303 forward-updates the stored version to the updated version, e.g., in accordance with the flowchart of FIG. 9.

The system 1301 also includes a roll-back update processor 1304. When the direction determination unit 1302 determines that the direction is roll-back, the roll-back update processor 1304 rolls-back the stored version to the original version, e.g., in accordance with the flowchart of FIG. 10.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following Claims:

The invention claimed is:

1. A method of in-place updating a stored version of content stored on a storage device using an update package that is adapted to update an original version of content to an updated version and that includes update commands in a particular order, the method comprising:
    determining a direction of the in-place updating; and
    in-place updating the stored version in accordance with the determined direction,
    wherein when the determined direction is forward, then in-place updating includes:
    forward-updating the stored version to the updated version, in accordance with the update commands included in said update package, according to the particular order;
    reserving content which has been deleted during the in-place updating; and
    storing the reserved content in segments of physical blocks in the storage device,
    wherein, when the determined direction is not forward, the in-place updating includes:
    deriving, from the update package, a roll-back sequence comprising reverting update commands wherein at least two reverting update commands in the derived roll-back sequence are ordered in an opposite order to the particular order of the update commands in the update package; and
    rolling-back the stored version to the original version by applying the roll-back sequence and utilizing reserved content when there has been a prior forward updating, and
    wherein at least one of the reverting update commands corresponds to a specified update command that is associated with a specified result and reverts the specified result of the specified update command.

2. The method of claim 1, wherein the stored version is one of the following: an original version, an updated version and an intermediate version.

3. The method of claim 1, wherein the update package includes update commands, each update command is one of the following: a copy update command, a delete update command, an insert update command and replace update command.

4. A method of in-place updating a stored version of content stored in a storage device using an update package that is adapted to update an original version of content to an updated version, the method comprising:
    determininq a direction of fthe updating;
    forward-updating the stored version to the updated version, when the determined direction is forward, wherein the forward-updating uses update commands included in the update package according to a particular order, wherein the forward-updating further includes reserving content when content is being deleted during the in-place updating, wherein reserved content is stored in segments of physical blocks in the storage device; and
    rolling-back the stored version to the original version, when the determined direction is not forward, wherein the rolling-back uses reverting update commands derived from the update package and wherein at least two derived reverting update commands are used in a reversed order and in view of the reserved content, when content has been reserved by a previous forward update, and wherein at least one of the reverting update commands corresponds to a specified update command that is associated with a specified result and reverts the specified result of the specified update command.

5. A system for in-place updating a stored version of content stored in a storage device using an update package, wherein the update package is adapted to update an original version of content to an updated version, wherein the update package includes update commands in accordance with a particular order, the system comprising:
    a direction determination unit adapted to determine direction of the in-place updating;
    a forward updating processor coupled to the direction determination unit and adapted to forward-update the stored version to the updated version in accordance with the particular order, when the determined direction of the updating is forward, and wherein the forward updating processor is further adapted to operate in accordance with the update commands included in the update package and to reserve content deleted during the in-place updating, wherein reserved content is being stored in segments of physical blocks in the storage;
    a roll-back sequence deriving unit coupled to the direction determination unit adapted to obtain from the update package, a roll-back sequence comprising reverting update commands wherein at least two derived reverting update commands are in accordance with an order opposite to the particular order of the update commands in the update package, when the determined direction of the updating is not forward; and
    a roll-back updating processor coupled to the roll-back sequence deriving unit adapted to roll back the stored version to the original version in accordance with the roll-back sequence, wherein the roll-back updating processor is further adapted to operate in accordance with update commands included in the roll-back sequence and in accordance with the reserved content,
    wherein at least one of the reverting update commands corresponds to a specified update command that is associated with a specified result and reverts the specified result of the specified update command.

6. The system of claim 5, wherein the direction determination unit is configured to determine the direction in accordance with a direction indication.

7. The system according to claim 5, wherein the stored version is one of a group including an original version, an updated version and an intermediate version.

8. A system for in-place updating a stored version of content stored in a storage device using an update package, wherein the update package comprises a sequence of update commands in a particular order and is adapted to update an original version of content to an updated version, the system comprising:
    a direction determination unit adapted to determine direction of the updating;
    a forward updating processor coupled to the direction determination unit adapted to forward-update the stored version to the updated version when the determined direction is forward, the forward updating processor is adapted to update the stored version in accordance with update commands included in the update package and in accordance with the particular order, and wherein the forward updating processor is further adapted to reserve content that has been deleted during the in-place updating, in segments of physical blocks in the storage device; and a roll-back updating processor coupled to the direction determination unit adapted to roll-back the stored version, when the determined direction is not forward, the roll-back updating processor is further adapted to update the stored version in accordance with reverting update commands derived from the update package, wherein at least two derived reverting update commands are in an order opposite to the particular order and in accordance with the reserved content, in case of a prior forward update, and wherein at least one of the reverting update commands corresponds to a specified update command that is associated with a specified result and reverts the specified result of the specified update command.

9. A method of in-place updating of a current version of content currently stored on a storage device with an updated version of the content, wherein the in-place updating results in overwriting of segments of physical blocks of the storage device which store the current version, with the updated version, throughout the updating, the method comprising:

providing an update package including a sequence of update commands in a first order, wherein the package does not include reverting update commands in an order other than the particular order;

providing a direction indication of either forward in-place updating or rollback in-place updating;

performing in-place forward updating, when the indication is forward, by executing the update commands in accordance with the first order while reserving content deleted throughout the execution of the forward in-place updating;

performing rollback in-place updating, when the indication is rollback, by:

deriving from the update package a sequence of reverting update commands in a second order wherein in the second order, at least two reverting update commands are in accordance with an opposite order to the first order, and executing the reverting update commands in accordance with the second order utilizing reserved content that has been reserved in case of a prior forward updating, wherein at least one of the reverting update commands corresponds to a specified update command that is associated with a specified result and reverts the specified result of the specified update command, and wherein the reserved content is stored in segments of physical blocks in the storage device.

10. The method according to claim 9, wherein the providing of the direction indication is enabled throughout the in-place updating more than once.

11. The method according to claim 1, wherein the determining of the direction of the in-place updating is enabled throughout the in-place updating more than once.

* * * * *